(12) United States Patent
Miyata

(10) Patent No.: US 11,586,397 B2
(45) Date of Patent: Feb. 21, 2023

(54) PRINTING SYSTEM, INFORMATION PROCESSING APPARATUS, AND RECORDING MEDIUM FOR SUPERIMPOSING AN IMAGE ON A PRINT TARGET IMAGE

(71) Applicant: Akira Miyata, Saitama (JP)

(72) Inventor: Akira Miyata, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 52 days.

(21) Appl. No.: 17/348,956

(22) Filed: Jun. 16, 2021

(65) Prior Publication Data

US 2022/0011988 A1   Jan. 13, 2022

(30) Foreign Application Priority Data

Jul. 8, 2020   (JP) .............................. JP2020-117915

(51) Int. Cl.
*G06F 3/12* (2006.01)
*G03G 15/01* (2006.01)

(52) U.S. Cl.
CPC ....... *G06F 3/1208* (2013.01); *G03G 15/0163* (2013.01); *G03G 2215/00037* (2013.01)

(58) Field of Classification Search
CPC .............. G06F 3/1208; G03G 15/0163; G03G 2215/00037
See application file for complete search history.

(56) References Cited

U.S. PATENT DOCUMENTS

| | | | | |
|---|---|---|---|---|
| 2011/0235062 A1* | 9/2011 | Suzuki | ............... | G03G 15/0131 358/1.2 |
| 2012/0050753 A1* | 3/2012 | Rakshit | ............. | G06K 15/4095 358/1.14 |
| 2019/0196363 A1* | 6/2019 | Tanaka | ............... | G03G 21/1676 |
| 2019/0196382 A1* | 6/2019 | Tanaka | .................. | G03G 21/04 |
| 2020/0336622 A1 | 10/2020 | Kunimi et al. | | |

FOREIGN PATENT DOCUMENTS

| | | |
|---|---|---|
| JP | 2006-038933 | 2/2006 |
| JP | 2019-117372 | 7/2019 |
| JP | 2020-177473 | 10/2020 |

* cited by examiner

*Primary Examiner* — Iriana Cruz
(74) *Attorney, Agent, or Firm* — IPUSA, PLLC

(57) ABSTRACT

A printing system includes an information processing apparatus including first circuitry and an image forming apparatus. The first circuitry is configured to receive designation of superimposing an image of a particular color on a print target image, associate the image of the particular color with the print target image in response to a reception of the designation of superimposing, and transmit print data including the print target image and the image of the particular color to the image forming apparatus. The image forming apparatus includes second circuitry configured to receive the print data and interpret the print data, and a printer engine configured to superimpose the image of the particular color on the print target image in printing, according to interpretation of the print data.

9 Claims, 15 Drawing Sheets

PRINTING SYSTEM, INFORMATION PROCESSING APPARATUS, AND RECORDING MEDIUM FOR SUPERIMPOSING AN IMAGE ON A PRINT TARGET IMAGE

CROSS-REFERENCE TO RELATED APPLICATION

This patent application is based on and claims priority pursuant to 35 U.S.C. § 119(a) to Japanese Patent Application No. 2020-117915, filed on Jul. 8, 2020, in the Japan Patent Office, the entire disclosure of which is hereby incorporated by reference herein.

BACKGROUND

Technical Field

Embodiments of this disclosure relate to a printing system, an information processing apparatus, and a non-transitory recording medium.

Related Art

Various characteristics are desired in toners used for image formation by laser printers and the like from the viewpoints of development, transfer, and fixing of the toner and image quality. For example, there is a technique of forming an image with a toner that reflects or absorbs light in a particular wavelength. For example, there is a technique of mixing an infrared absorber in a standard color toner of cyan (C), magenta (M), yellow (Y), and black (K) for image formation. Conventionally, such a method requires a dedicated application software that supports printing with a particular color (spot color).

SUMMARY

An embodiment of the present disclosure provides a printing system that includes an information processing apparatus and an image forming apparatus. The information processing apparatus includes first circuitry configured to receive designation of superimposing an image of a particular color on a print target image, associate the image of the particular color with the print target image in response to a reception of the designation of superimposing, and transmit print data including the print target image and the image of the particular color to the image forming apparatus. The image forming apparatus includes second circuitry and a printer engine. The second circuitry is configured to receive the print data and interpret the print data. The printer engine is configured to superimpose the image of the particular color on the print target image in printing, according to interpretation of the print data.

Another embodiment of the present disclosure provides an information processing apparatus including circuitry. The circuitry is configured to receive designation of superimposing an image of a particular color on a print target image, associate the image of the particular color with the print target image in response to a reception of the designation of superimposing, and transmit print data including the print target image and the image of the particular color to an image forming apparatus.

Another embodiment of the present disclosure provides a non-transitory recording medium storing a plurality of program codes which, when executed by one or more processors, causes the processors to perform a method for processing information. The method includes receiving designation of superimposing an image of a particular color on a print target image, associating the image of the particular color with the print target image in response to a reception of the designation of superimposing, and transmitting print data including the print target image and the image of the particular color to an image forming apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1A:
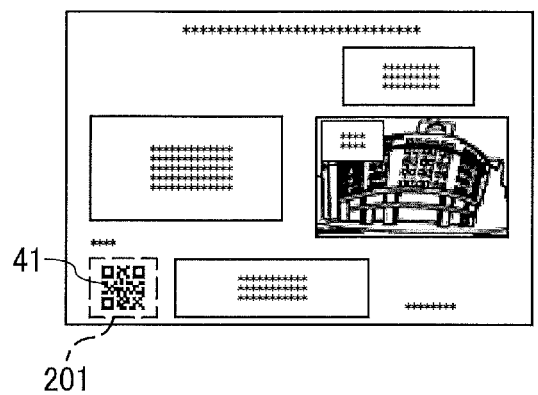
FIGS. 1A and 1B are diagrams illustrating printing using a spot color according to a comparative technique.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The color of the image displayed on a display by an information processing apparatus image is represented by additive color mixture method of red, green, and blue (RGB). For this reason, an application software that operates in an information processing apparatus generally forms an image in RGB. When a document in which the color is expressed in RGB is printed, the color components are converted into cyan, magenta, yellow, and black. Therefore, for printing in a particular color other than cyan, magenta, yellow, and black, both application software capable of designating the particular in printing and an image forming apparatus that supports the designation of the particular color are required.

General application software does not support use of particular colors. Some image processing application software can add a particular color in addition to RGB colors to handle documents.

Referring now to the drawings, embodiments of the present disclosure are described below. As used herein, the singular forms "a," "an," and "the" are intended to include the plural forms as well, unless the context clearly indicates otherwise.

Figure 1B:
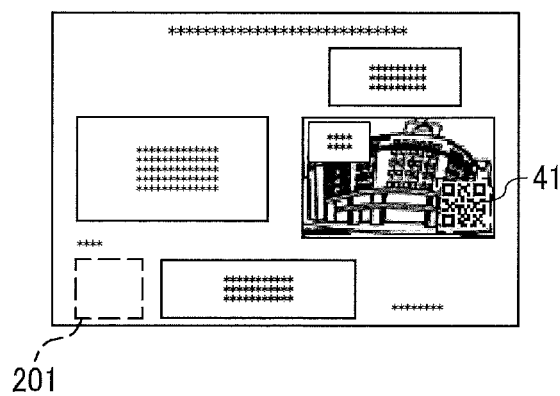

First, a description is given of printing using a particular color (spot color) according to a comparative technique with reference to FIGS. 1A and 1B. FIGS. 1A and 1B are diagrams illustrating a comparative method for printing with a spot color (special color or particular color) toner, using a general-purpose application software that handles red, green, and blue (RGB) image data (an application software that does not create a spot color layer). In this example, as illustrated in FIG. 1A, a user embeds, in a registered portion 201 of a print image (print target image) to be printed, an embedded image to be printed with a spot color toner. The embedded image is, for example, a barcode to be printed with an infrared (IR) toner (hereinafter referred to as an IR toner image 41).

The position of the portion 201 is designated. An image forming apparatus cuts out the IR toner image 41 from the portion 201 of the print image and superimposes the IR toner image 41 on the separately designated position (a photograph area in FIGS. 1A and 1B). Accordingly, the portion 201 of the print image as the result remains white. Although the image forming apparatus 30 can keep the IR toner image 41 in the portion 201 of the print image, it is not preferable that the barcode or the like remains therein. That is, an area for the IR toner image 41 is required in the print image. Therefore, inconveniently, not the entire page is usable for the user to design the print image.

Overview of Operation of Printing System

Figure 2A:
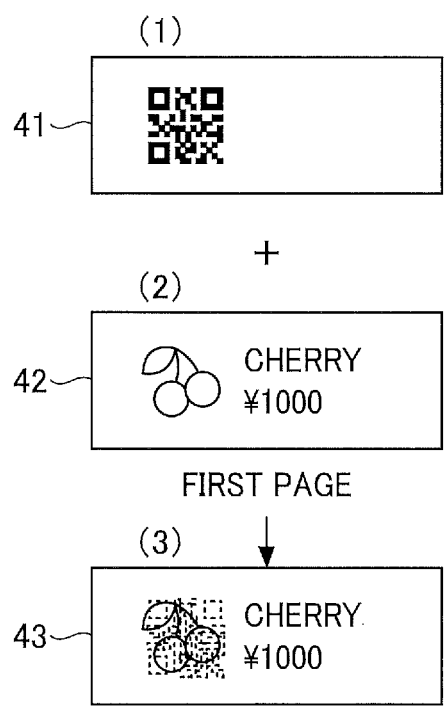
FIG. 2A illustrates a print image, an infrared (IR) toner image, and a printed result in a first case according to one embodiment of the present disclosure.
Figure 2B:
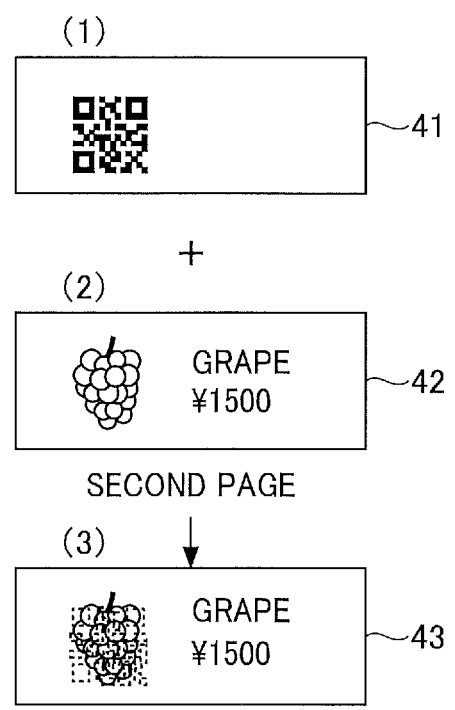
FIG. 2B illustrates a print image, an IR toner image, and a printed result in a second case according to one embodiment.
Figure 3:
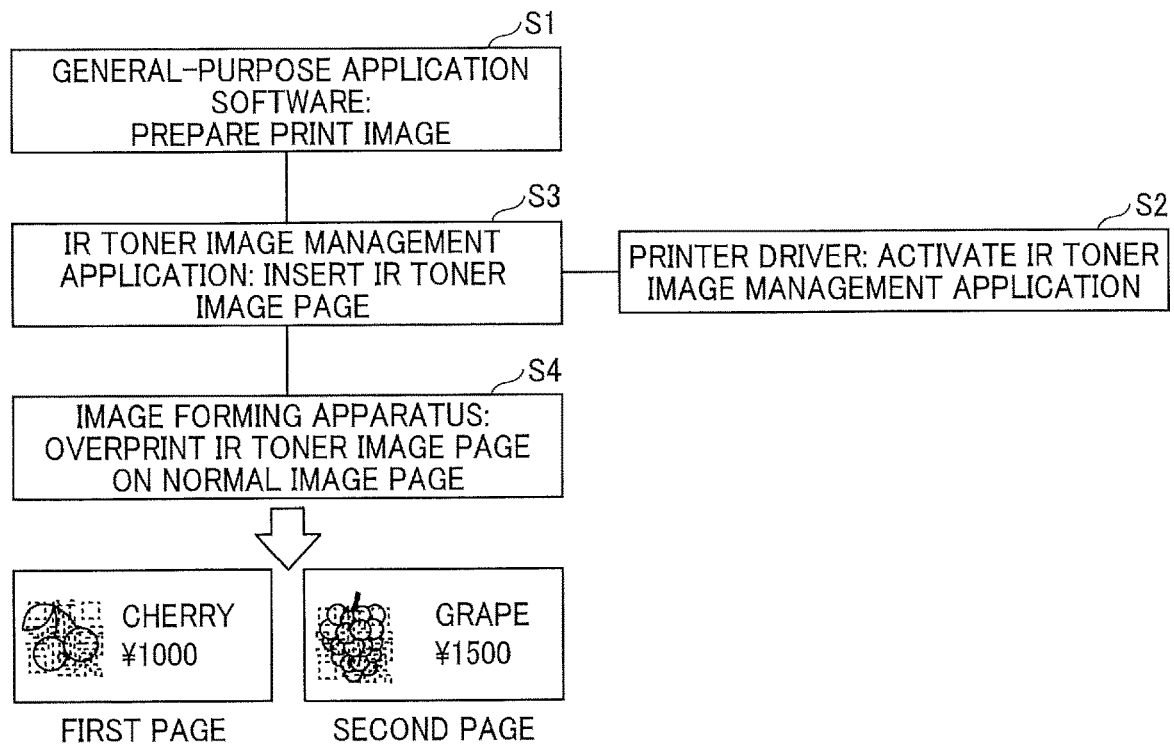
FIG. 3 is a diagram illustrating operation in the first case, where an IR toner image management application inserts a page of an infrared toner image in front of a page of a print image.
Figure 4:
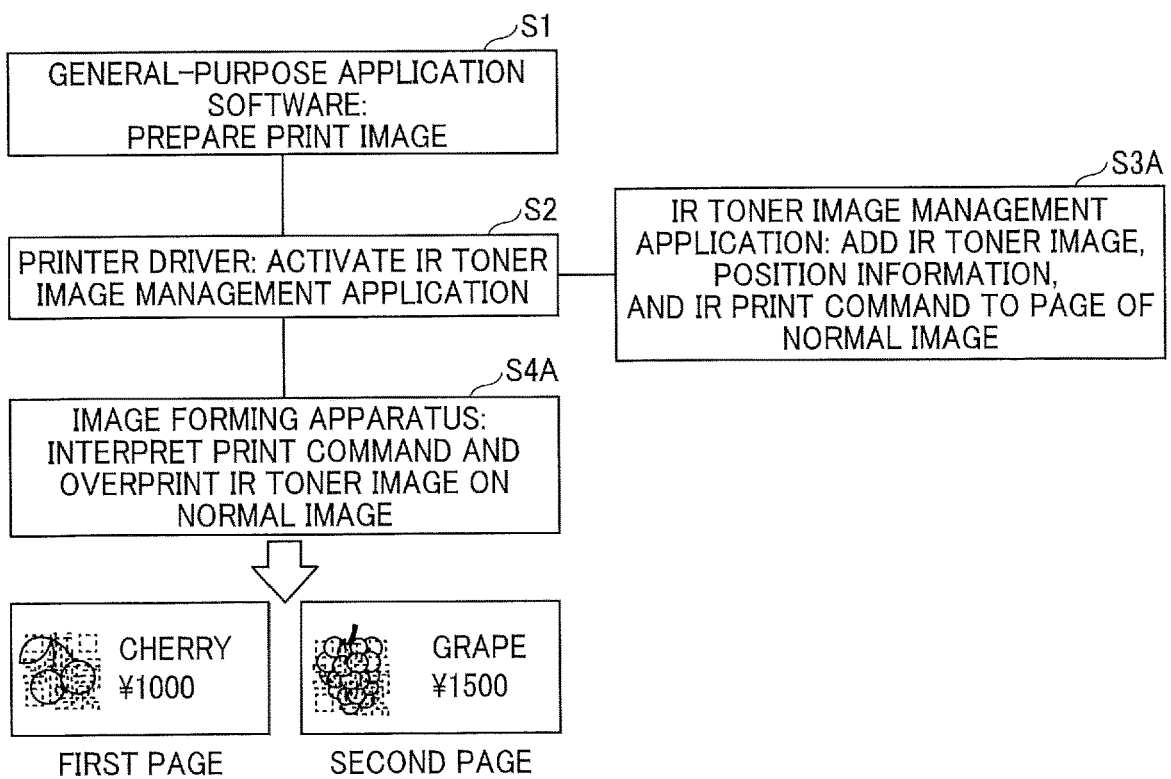
FIG. 4 is a diagram illustrating operation in the second case, where the IR toner image management application adds print position information of an IR toner image to print data of a print image.

With reference to FIGS. 2A, 2B, 3 and 4, descriptions are given of the outline of a method for forming an image with a spot color, performed by an image forming apparatus 30 (30A or 30B in FIG. 5) according to the present embodiment. FIGS. 2A and 2B illustrate examples of the print image, the IR toner image, and a printed result. FIGS. 2A and 2B are different in whether the print image has one page or two pages, but the processing flow is the same except that the print result differs depending on the page difference. FIGS. 3 and 4 are flowcharts schematically illustrating examples of the operation performed by a printing system 100 (FIG. 5) according to the present embodiment. The processing is mainly performed by an information processing apparatus 10 and the image forming apparatus 30.

Referring to FIGS. 2A and 2B, (1) the information processing apparatus 10 includes application software that handles a plurality of IR toner images (for example, quick response (QR) codes in FIGS. 2A and 2B). The application software receives, from a user, designation of an IR toner image 41 for each page at the time of printing. Hereinafter, this application software is referred to as an IR toner image management application 12 (illustrated in FIG. 8). The IR toner image management application 12 can also store the association between each page of the print image and the IR toner image.

(2) The user operates general-purpose application software to prepare a print image 42 to be printed. In FIGS. 2A and 2B, a picture of cherries accompanied by a price and a picture of grapes accompanied by a price are the print images 42.

(3) When the user instructs printing, the image forming apparatus 30 (see FIG. 5) superimposes the IR toner image 41 on the print image 42. On a printed matter 43 output, the print image 42 is superimposed with the IR toner image 41 that is transparent to the naked eye.

Next, with reference to FIGS. 3 and 4, descriptions are given of two cases (examples) of forming IR toner images according to the present embodiment. In a first case, the IR toner image management application 12 inserts a page of an IR toner image to be printed with an IR toner, before the page of the print image. In a second case, the IR toner image management application 12 adds an IR toner image and print position information to the print image.

The first case is described with reference to FIG. 3.

In S1, according to a user operation, the information processing apparatus 10 prepares a print image with general-purpose application software.

In S2, in response to designation by the user of printing with the IR toner, a printer driver 11 (see FIG. 8) invokes (activates) the IR toner image management application 12. The printer driver 11 transfers the print data of the print image to the IR toner image management application 12.

In S3, according to a user operation, the IR toner image management application 12 designates an IR toner image page by page in the print image. The IR toner image management application 12 inserts the page of the IR toner image before the page of the print image, thus generating document data having at least two pages. Further, a print command instructing printing with the IR toner is added to the IR toner image. After completing processing of all the pages, the IR toner image management application 12 returns the print image and the IR image to the printer driver 11.

Figure 5:
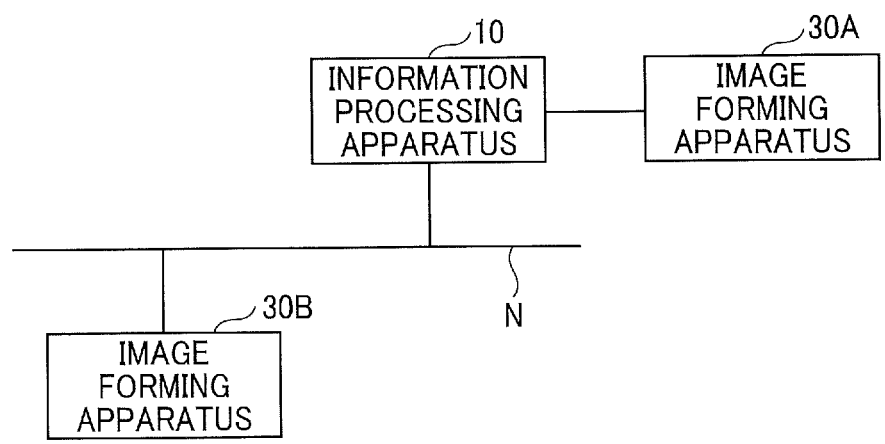
FIG. 5 is a schematic diagram illustrating an example of a configuration of a printing system according to one embodiment.

In S4, the printer driver 11 transmits the print data of the print image and the IR toner image to the image forming apparatus 30 (see FIG. 5). The image forming apparatus 30 interprets the print command added to the print data and determines whether or not IR toner printing is designated, for each page. In response to a determination that the IR toner printing is designated, the image forming apparatus 30 temporarily stores that page. When the next page is a normal image page (without the designation of IR toner printing), the image forming apparatus 30 overprints the IR toner print page on the normal image page (details of overprint will be described with reference to FIGS. 20A to 20C). Thus, the IR toner image can be superimposed on the target image in printing.

The second case is described with reference to FIG. 4. The steps S1 to S2 can be the same as those in the first case illustrated in FIG. 3.

In S3A, the user operates the IR toner image management application 12 to designate an IR image page by page in the print image. The user also designates the position of the IR toner image in the print image. The IR toner image management application 12 adds the IR toner image, print position information, and a print command instructing printing with the IR toner for each page of the print image.

In S4A, the image forming apparatus 30 interprets the print command of the print data. When IR toner printing is designated, the designated IR toner image is overprinted with IR toner at the designated position on the print target image.

In this way, the printer driver 11 accepts the IR toner print designation and transfers the print data to the IR toner image management application 12. Then, the IR toner image management application 12 associates the IR toner image designated by the user with the print image. After processing all the pages, the IR toner image management application 12 returns the print data to the printer driver 11 and transfers the print data processed by the printer driver 11 to the image forming apparatus 30. The image forming apparatus 30 analyzes the print data for each page and overprints the IR toner image with the IR toner on the print image assigned with the print command of printing with the IR toner.

Therefore, the printing system 100 can perform printing using an IR toner with a general application that handles RGB image data. Further, the printing system 100 allows the user to use the entire page to design a print image.

Regarding terms used in the present disclosure, a particular color (spot color or special color) refers to a color other than cyan, magenta, yellow, and black (these are called process colors). For example, the particular color (spot color) is gold, silver, white, or transparent. Since some image forming apparatus 30 (particularly inkjet type) can use inks of different colors in addition to cyan, magenta, yellow, and black, the spot color may be different depending on the image forming apparatus 30. Moreover, the particular color (spot color) can be a color that is not expressed with RGB by the application software. A coloring material such as toner or ink capable of printing a spot color is called a spot color material (or special color material). In this embodiment, the color of the IR toner is the spot color.

Further, the term "transparent" represents being invisible to light of a certain wavelength. Being "transparent" is not necessarily completely invisible. Being "transparent" satisfies at least one of seemingly invisible and not capturable by an imaging device. The transparent toner or ink may be called stealth toner or stealth ink.

In the present embodiment, for example, the image forming apparatus 30 in which a spot color is assigned to black is used, instead of an image forming apparatus capable of designating and printing a spot color other than cyan, magenta, yellow, and black. That is, the colors handled by the image forming apparatus 30 can be only cyan, magenta, yellow, and black. The image forming apparatus 30 according to the present embodiment does not use black toner, and the black toner cartridge contains a spot color material. However, an image forming apparatus (that handles cyan, magenta, yellow, black, and spot color) capable of designating and printing a spot color can also be used.

A particular color image is an image printed in a spot color. In the present embodiment, an IR toner image will be described as an example.

System Configuration

FIG. 5 is a schematic diagram illustrating a configuration of the printing system 100. The printing system 100 illustrated in FIG. 5 includes the information processing apparatus 10 and one or more image forming apparatuses 30 (30A and 30B in FIG. 5). In FIG. 5, the image forming apparatus 30A is connected to the information processing apparatus 10 by a dedicated line, and the image forming apparatus 30B is connected via a network N to the information processing apparatus 10. Any one of the image forming apparatuses 30A and 30B is referred to as the "image forming apparatus 30."

The information processing apparatus 10 and the image forming apparatus 30A are connected peer to peer (one-to-one) by the dedicated line such as a Universal Serial Bus (USB) cable. However, the connection therebetween is not necessarily constantly maintained, and a user can attach and detach the dedicated line. In addition to the USB cable, examples of the dedicated line include, a personal computer (PC) card, a peripheral component interconnect (PCI) bus, an Institute of Electrical and Electronics Engineers (IEEE) 1394 bas, and a small computer system interface (SCSI).

Further, the information processing apparatus 10 and the image forming apparatus 30A may be wirelessly connected to each other so as to communicate with each other. Examples of peer to peer wireless communication includes BLUETOOTH (registered trademark) and wireless local area network (LAN).

The information processing apparatus 10 is communicably connected to the image forming apparatus 30B via the network N. The network N is assumed to be a general-purpose network such as a LAN or the Internet. The LAN is, for example, a LAN in a facility such as an office where the image forming apparatus 30B is installed. The network N may include a virtual private network (VPN) and a wide area ETHERNET (registered trademark). The network N may be a wired network, a wireless network, or a combination of a wired network and a wireless network.

The information processing apparatus 10 executes various control programs, such as an operating system (OS) and the printer driver 11, and application software, and provides functions corresponding to the application software. The information processing apparatus 10 is often called a computer. The control program is, for example, a program that is so-called a device driver (software prepared to enable the OS to control hardware and the like connected to a personal computer). An example of the device driver is the printer driver 11. Specific examples of the information processing apparatus 10 include a personal computer (PC), a smartphone, a tablet terminal, a personal digital assistant (PDA), and a wearable PC.

Examples of the information processing apparatus 10 further include an electronic whiteboard capable of mutual communication, an output device such as digital signage, a projector, and a video conference terminal. That is, the information processing apparatus 10 can be any device in which the OS, control program, and application software operate.

The image forming apparatus 30 forms an image such as a character (text) or a figure mainly with toner or ink on a recording medium. The printing system 100 according to the present embodiment can print cyan, magenta, and yellow image data with a toner or ink (hereinafter referred to as visible material) that can be read with the naked eye and further print K image data with a spot color material (toner or ink). The image forming apparatus 30 can form an image on one recording medium using both a visible material and a spot color material or, alternatively, using only one of the visible material and the spot color material.

Usable as the spot color material is a toner or ink that has absorbency in the wavelength range (around 850 nm) of infrared light including near-infrared light and has less absorbency in the wavelength range of visible light (about 400 to 700 nm). That is, in the spot color material, the absorbency in the visible wavelength range is smaller than the absorbency in the infrared wavelength range. Such a spot color material is transparent to visible light (invisible) and legible when irradiated with infrared light. Therefore, the spot color means transparent to visible light. When irradiated with infrared light, the spot color material absorbs infrared light and looks black. The colors cyan, magenta, and yellow are transparent to infrared light. On the other hand, there are two kinds of black materials (ordinary black toner), one kind of black material absorbs infrared light and the other kind of black material does not absorbs infrared light. When a black image that absorbs infrared light is formed together with an image of the spot color material, both images look black, making it difficult to recognize a barcode or the like formed with the spot color material. In this case, it is not desirable to form the black image that absorbs infrared light and the spot color image on the same sheet. On the other hand, even when a black image that does not absorb infrared light is formed together with the spot color image, only the spot color image looks black when irradiated with infrared light. Accordingly, a barcode or the like formed with the spot color material is recognizable. In this embodiment, a description is given of the image forming apparatus 30 that performs printing without using a black color material. Therefore, black is expressed by superimposing cyan, magenta, and yellow. Note that there is no problem in printing using five colors of cyan, magenta, yellow, black that does not absorb infrared light, and spot color.

Since the spot color material can be used to print information used for determining the authenticity of the output product, the spot color material has the effect of inhibiting duplication of the output product. Therefore, since the security is improved, the spot color material can be said to be a consumer material for security.

The spot color material may be a toner or ink having absorbency relative to ultraviolet light (UV) and a small absorbency relative to visible light. Further, an image may be formed with a material that is transparent in a normal state and is visualized by a chemical change by application of heat, laser, a chemical, or the like. Alternatively, information may be rendered an image having irregularities, so as to be difficult to be recognized with the naked eye.

Further, the recording medium on which the image forming apparatus 30 performs printing may be any medium to which toner or ink can adhere. Specifically, the recording medium is a medium on which the toner or ink can temporarily adhere and then solidify or permeate. Specific examples of the recording medium include recording media such as paper, recording paper, film, and cloth; electronic components such as electronic boards and piezoelectric elements; and powder layers (particle layers), and any material to which the toner or ink adheres is included unless otherwise specified.

The above-mentioned "material to which toner or ink adheres" can be any material, such as paper, thread, fiber, cloth, leather, metal, plastic, glass, wood, ceramics, or the like, as long as toner or ink can temporarily adhere.

The image forming apparatus 30 includes an electrophotographic printer, an inkjet printer that discharges liquid (droplets), and a printer that thermally transferring an ink ribbon. The image forming apparatus 30 may be a multifunction peripheral (MFP). The "multifunction" of the multifunction peripheral means having a plurality of functions of, for example, image forming, facsimile transmission and reception, scanning of a document, and copying. In the present embodiment, having the image forming function is sufficient. The image forming apparatus 30 may also be called a printer.

Example of Hardware Configuration

Descriptions are given below of the hardware configurations of the information processing apparatus 10 and the image forming apparatuses 30 of the printing system 100.

Information Processing Apparatus

Figure 6:
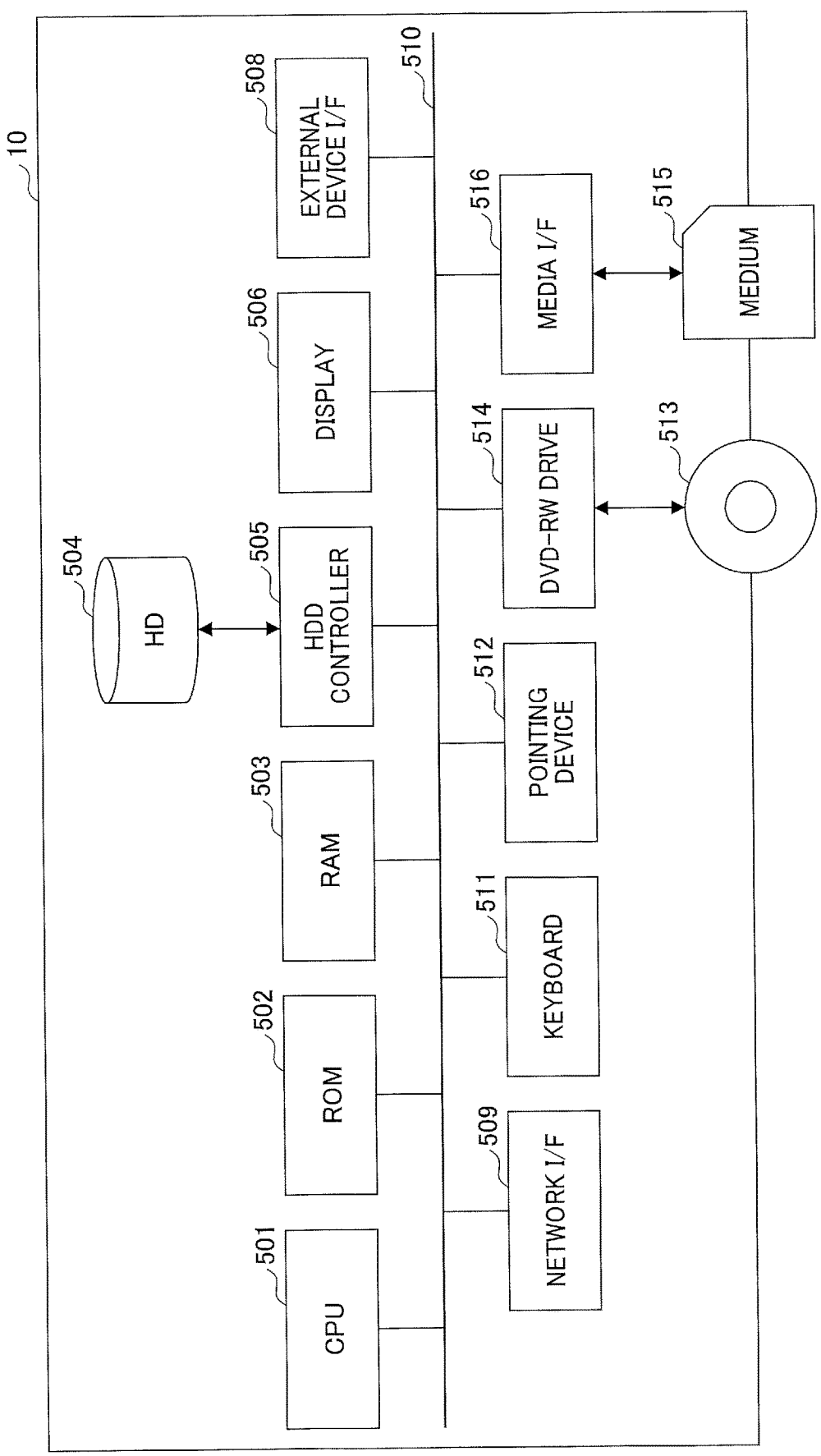
FIG. 6 is a block diagram illustrating an example of a hardware configuration of an information processing apparatus of the printing system illustrated in FIG. 5.

FIG. 6 is a block diagram illustrating an example of the hardware configuration of the information processing apparatus 10. As illustrated in FIG. 6, the information processing apparatus 10 is, for example, a computer and includes a central processing unit (CPU) 501, a read only memory (ROM) 502, a random access memory (RAM) 503, a hard disk (HD) 504, a hard disk drive (HDD) controller 505, a display 506, an external device interface (I/F) 508, a network I/F 509, a data bus 510, a keyboard 511, a pointing device 512, a digital versatile disk-rewritable (DVD-RW) drive 514, and a media I/F 516.

The CPU 501 controls the entire operation of the information processing apparatus 10. The ROM 502 stores a control program for driving the CPU 501, such as an initial program loader (IPL). The RAM 503 is used as a work area for the CPU 501. The HD 504 is a storage area that stores various data such as a program. The HDD controller 505 controls reading and writing of various data from and to the HD 504 under control of the CPU 501. The display 506 displays various information such as a cursor, a menu, a window, a character, or an image. The external device I/F 508 is an interface for connecting to various external devices. Examples of the external device include, but are not limited to, a universal serial bus (USB) memory and a printer. The network I/F 509 is an interface for performing data communication using the network N. The data bus 510 is an address bus, a data bus, or the like that electrically connect components, such as the CPU 501, illustrated in FIG. 6.

The keyboard 511 is an example of an input device provided with a plurality of keys for allowing a user to input characters, numerals, or various instructions. The pointing device 512 is an example of an input device that allows a user to select or execute various instructions, select a target for processing, or move a cursor being displayed. The DVD-RW drive 514 reads and writes various data from and to a DVD-RW 513, which is an example of a removable recording medium. The removable recording medium is not limited to a DVD-RW and may be digital versatile disc-recordable (DVD-R) or the like. The media I/F 516 controls reading and writing (storing) of data from and to a medium 515 (a storage medium) such as a flash memory.

Image Forming Apparatus

Figure 7:
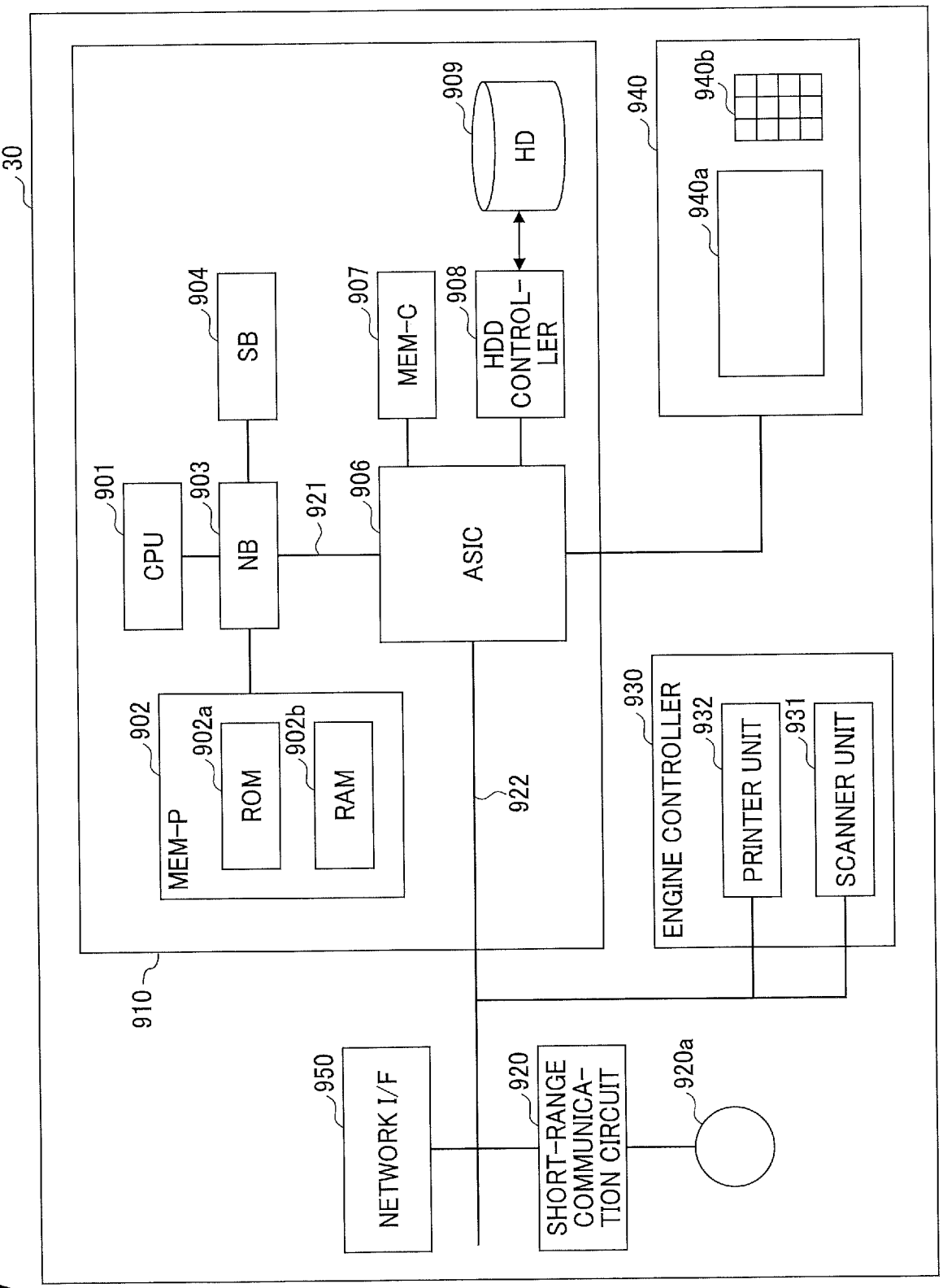
FIG. 7 is a block diagram illustrating an example of a hardware configuration of an image forming apparatus of the printing system illustrated in FIG. 5.

FIG. 7 is a schematic block diagram illustrating an example of the hardware configuration of the image forming apparatus 30. As illustrated in FIG. 7, the image forming apparatus 30 includes a controller 910, a short-range communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an application specific integrated circuit (ASIC) 906, a local memory (MEM-C) 907 as a storage area, a hard disk drive (HDD) controller 908, and a hard drive (HD) 909 as a storage area. The NB 903 and the ASIC 906 is connected by an accelerated graphics port (AGP) bus 921.

The CPU 901 controls an entire operation of the image forming apparatus 30. The NB 903 connects the CPU 901, with the system memory 902, SB 904, and AGP bus 921. The NB 903 includes a memory controller for controlling reading or writing of various data with respect to the system memory 902, a Peripheral Component Interconnect (PCI) master, and an AGP target.

The system memory 902 includes a ROM 902a and a RAM 902b. The ROM 902a stores data and program for implementing various functions of the controller 910. The RAM 902b is used to load the program and the data. The RAM 902b is also used as a drawing memory to store drawing data for printing. For the purpose of distribution, the program stored in the RAM 902b can be stored in any computer-readable recording medium, such as a compact disc-read only memory (CD-ROM), a compact disc-recordable (CD-R), or a digital versatile disk (DVD), in a file format installable or executable by a computer.

The SB 904 connects the NB 903 with a peripheral component interconnect (PCI) device or a peripheral device. The ASIC 906 is an integrated circuit (IC) for image processing having a hardware element for image processing and acts as a bridge that connects the AGP bus 921, a PCI bus 922, the HDD controller 908, and the local memory 907 to each other. The ASIC 906 includes a PCI target, an AGP master, an arbiter (ARB) as a central processor of the ASIC 906, a memory controller to control the local memory 907, a plurality of direct memory access controllers (DMACs), and a PCI unit. The DMACs is capable of converting coordinates of image data with a hardware logic. The PCI unit transfers data between a scanner unit 931 and a printer unit 932 through the PCI bus 922. The ASIC 906 may be connected to a universal serial bus (USB) interface, or the Institute of Electrical and Electronics Engineers 1394 (IEEE1394) interface.

The local memory 907 is used as a buffer storing image data to be copied or a buffer storing data to be coded. The HD 909 is a storage area that stores various image data, font data for printing, and form data. The HD 909 controls the reading or writing of data from or into the HD 909 under the control of the CPU 901. The AGP bus 921 is a bus interface for a graphics accelerator card, which is proposed to accelerate graphics processing. Through directly accessing the system memory 902 by high-throughput, speed of the graphics accelerator card is improved.

The short-range communication circuit 920 includes a short-range communication antenna 920a. The short-range communication circuit 920 is a communication circuit that communicates in compliance with the near field communication (NFC), the Bluetooth (®) and the like.

The engine controller 930 includes the scanner unit 931 and the printer unit 932. The control panel 940 includes a panel display 940a and a hard keys 940b. The panel display 940a is, e.g., a touch panel that displays current settings or a selection screen and that receives a user input. The hard keys 940b include, e.g., a numeric keypad and a start key. The numeric keypad receives assigned values of image forming parameters such as an image density parameter. The start key receives an instruction to start copying. The controller 910 controls the entire operation of the image forming apparatus 30 and controls, for example, drawing, communication, and input from the control panel 940. The scanner unit 931 or the printer unit 932 has a capability of image processing such as error diffusion and gamma conversion.

Note that, in response to an instruction to select a specific application through the control panel 940 by use of, e.g., an application (or mode) switch key, the image forming apparatus 30 selectively performs a document server function, a copier function, a printer function, and a facsimile function. When the document server function is selected, the operation mode is changed to a document box mode to store document data. With selection of the copy function, the operation mode is changed to a copy mode. With selection of the print function, the operation mode is changed to a printer mode. With selection of the facsimile function, the operation mode is changed to a facsimile mode.

The network I/F 950 controls communication of data with an external device through the network N. The short-range communication circuit 920 and the network I/F 950 are electrically connected to the ASIC 906 through the PCI bus 922.

Descriptions are given of the functions of the information processing apparatus 10 and the image forming apparatuses 30, with reference to FIGS. 8 to 11.

Information Processing Apparatus

Figure 8:
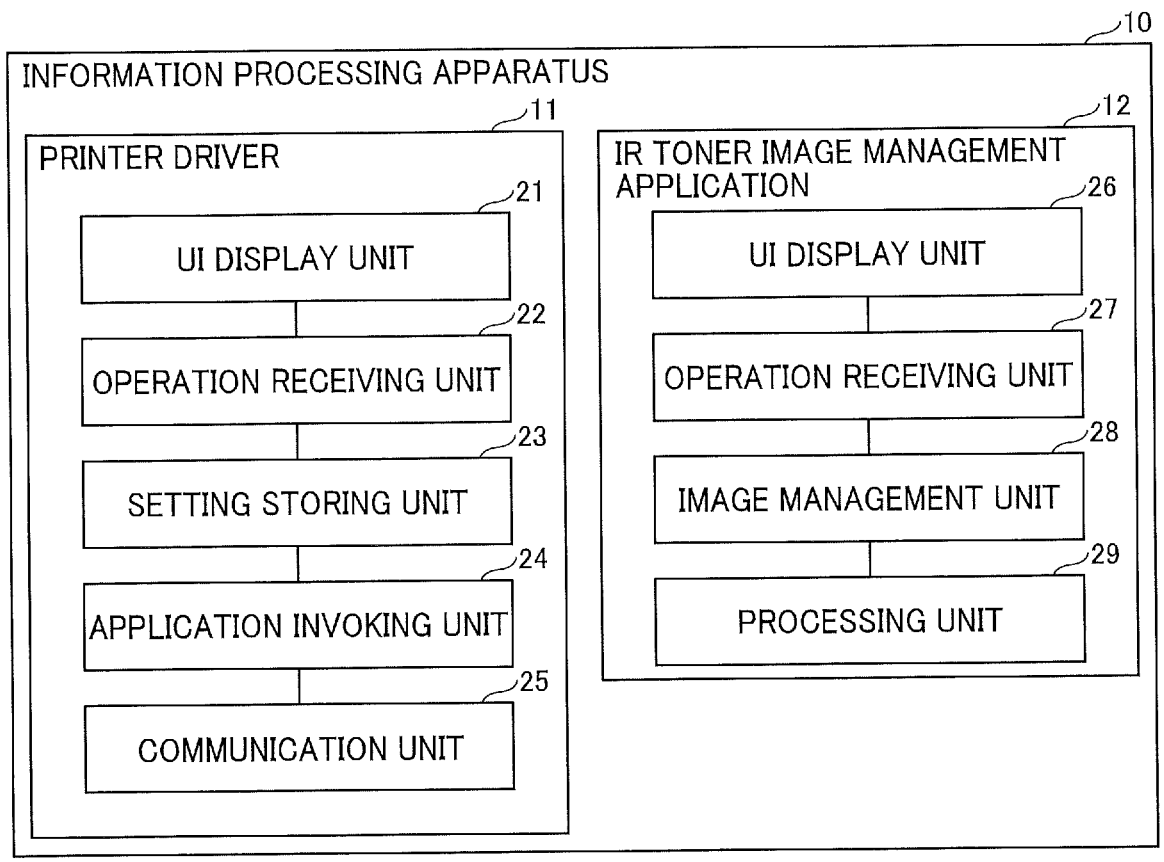
FIG. 8 is a block diagram illustrating an example of a functional configuration of the information processing apparatus illustrated in FIG. 6.

FIG. 8 is a block diagram illustrating an example of the functional configuration of the information processing apparatus 10. In the information processing apparatus 10, two programs, namely, the printer driver 11 and the IR toner image management application 12 operate. The general-purpose application software for invoking the printer driver 11 is omitted in FIG. 8.

This general-purpose application software may be any software that can invoke the printer driver 11. For example, there are word processing software, presentation software, spreadsheet software, portable document format (PDF) software, and browser software. Each of such application software saves and reads a file in the corresponding format. Although the functional units of the information processing apparatus 10 are divided into two programs in FIG. 8, alternatively, for example, the printer driver 11 may have a function of the IR toner image management application 12.

When printing a document, the user invokes the printer driver 11 from application software, and the printer driver 11 automatically activates the IR toner image management application 12. In the IR toner image management application 12, the user can designate an IR toner image for each page (the IR toner image may not be designated depending on the page). In some cases, the user can also designate the position of the print image in the IR toner image. Therefore, the user can operate the IR toner image management application 12 in addition to the conventional work for printing a document on the application software, and the operability is not easily lowered.

The printer driver 11 is described. The printer driver 11 includes a user interface (UI) display unit 21, an operation receiving unit 22, a setting storing unit 23, an application invoking unit 24, and a communication unit 25. These units of the printer driver 11 provide functions implemented by one or more hardware components illustrated in FIG. 6 operating responding to instructions from the CPU 501 according to the printer driver 11 loaded to the RAM 503 from the HD 504.

The UI display unit 21 displays a print setting screen (a user interface) in which the printer driver 11 accepts print settings. The operation receiving unit 22 receives print settings and settings from the user as to whether or not to perform printing using the IR toner. The print settings include setting of color or monochrome, number of copies, double-sided, and combining pages. The setting storing unit 23 stores the setting of whether or not to perform printing with the IR toner, which the operation receiving unit 22 receives from the user.

The application invoking unit 24 invokes the IR toner image management application 12 based on the settings stored by the setting storing unit 23, and transmits print data to the IR toner image management application 12. Further, the application invoking unit 24 receives the print data processed by the IR toner image management application 12. The communication unit 25 can communicate with the image forming apparatus 30. The communication unit 25 transmits print data to the image forming apparatus 30 and is an example of a first communication unit.

The IR toner image management application 12 is described. The IR toner image management application 12 includes a UI display unit 26, an operation receiving unit 27, an image management unit 28, and a processing unit 29. These units of the IR toner image management application 12 provide functions implemented by one or more hardware components illustrated in FIG. 6 operating responding to instructions from the CPU 501 according to the printer driver 11 loaded to the RAM 503 from the HD 504.

The UI display unit 26 displays a screen of the IR toner image management application 12. On this screen, the user can designate the combination of each page of the print image and the IR toner image and can designate the print position of the IR toner image. The operation receiving unit 27 receives the designation of the combination of each page of the print image and the IR toner image and the designation of the print position of the IR toner image. The print position of the IR toner image is designated in the second case. Further, the IR toner image management application 12 may determine that the second case is selected in response to the designation of the print position of the IR toner image.

The image management unit 28 controls the IR toner image associated with the print image. The user can register the IR toner image in advance, or at the time of printing using the IR toner. Details of the IR toner image controlled by the image management unit 28 will be described with reference to FIG. 9.

The processing unit 29 inserts the IR toner image before the print image page in the first case in accordance with the combination of the print image page and the IR toner image designated by the user. In the second case, the IR toner image and the print position information thereof are added to the page of the print image according to the print position information designated by the user. In either case, to the page involving printing with the IR toner, a print command instructing printing with the IR toner is added.

Figure 9:
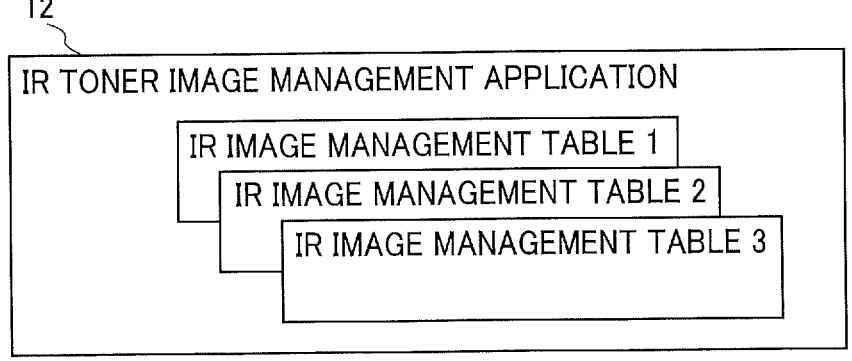
FIG. 9 is a diagram illustrating image management tables owned by the IR toner image management application.

FIG. 9 is a diagram illustrating image management tables owned by the IR toner image management application 12. As illustrated in FIG. 9, the IR toner image management application 12 has one IR image management table n (n is an integer equal to or greater than 1) for each IR toner image. The IR image management table n is a table for controlling the IR toner image. The user can register a new IR image management table and can edit and delete an existing IR image management table.

Figure 10A:
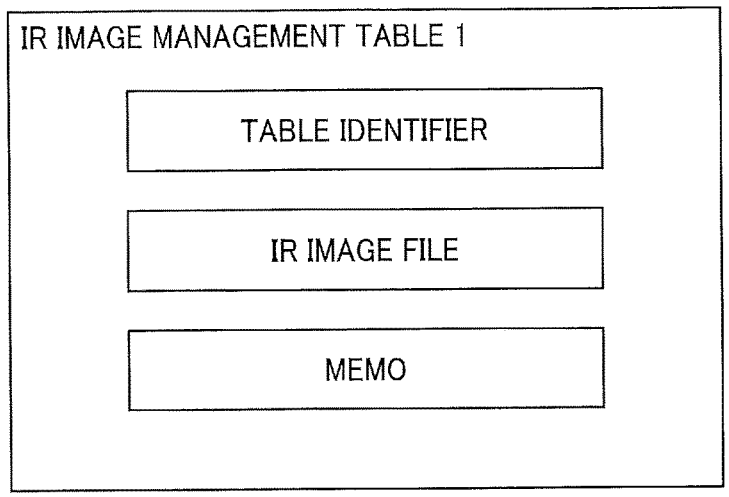
FIGS. 10A, 10B, and 10C are diagrams illustrating an example of a configuration of the IR image management table.
Figure 10B:
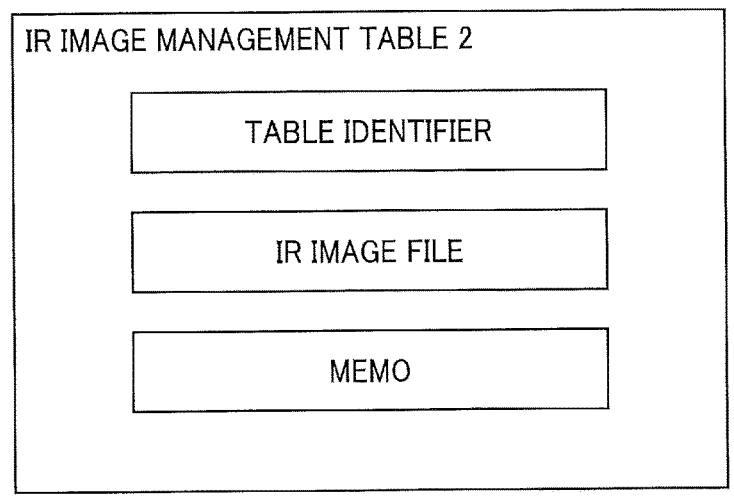
Figure 10C:
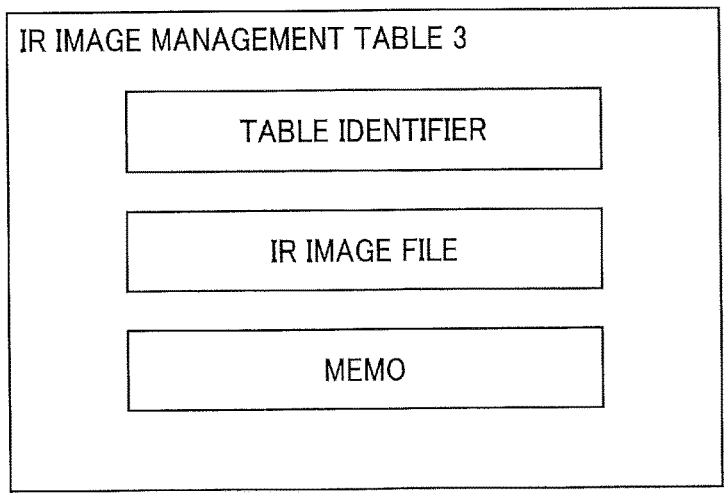

FIGS. 10A and 10B are diagrams illustrating examples of the configuration of the IR image management table. FIG. 10A illustrates the configuration of the IR image management table 1, FIG. 10B illustrates the configuration of the IR image management table 2, and FIG. 10C illustrates the configuration of the IR image management table 3. As illustrated in FIGS. 10A, 10B, and 10C, the IR image management table n can contain a table identifier identifying the IR toner image, an IR image file in which the IR toner image is stored, and a memo. These can be registered by the user.

Image Forming Apparatus

Figure 11:
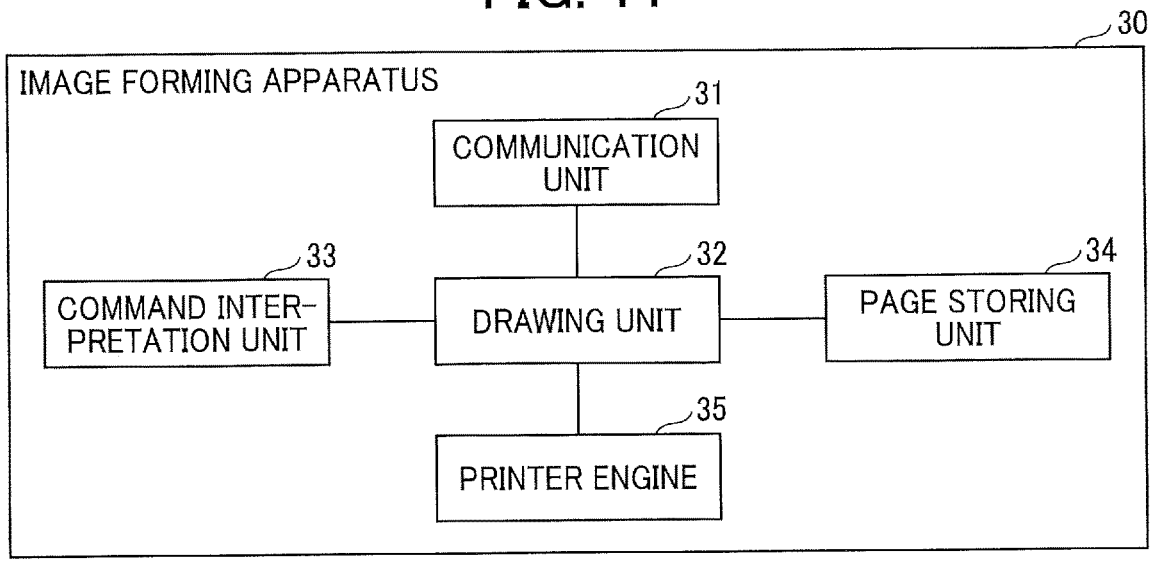
FIG. 11 is a block diagram illustrating an example of a functional configuration of the image forming apparatus illustrated in FIG. 7.

FIG. 11 is a block diagram illustrating a functional configuration of the image forming apparatus 30. The image forming apparatus 30 includes a communication unit 31, a drawing unit 32, a command interpretation unit 33, a page storing unit 34, and a printer engine 35. These units of the image forming apparatus 30 provide functions implemented by one or more hardware components illustrated in FIG. 7 operating responding to instructions from the CPU 901 according to a control program loaded to the RAM 902$b$ from the HD 909.

The communication unit 31 receives print data from the printer driver 11 and is as an example of a second communication unit. The drawing unit 32 interprets the print data received by the communication unit 31 and generates image data (bitmap data) for each page. The drawing unit 32 transmits the image data to the printer engine 35. In interpreting the print data, when the print data includes a print command, the drawing unit 32 transmits the print command to the command interpretation unit 33. The print command is described in Printer Control Language (PCL) and designates where to form characters and images. This print command further includes instructions or settings for printing with the IR toner.

In the first case, when the print data concerns a page to be printed with IR toner, the drawing unit 32 transmits the image data of the IR toner image to the page storing unit 34 and saves the image data therein. Then, the drawing unit 32 generates the image data of the print image of the next page. After generating the image data of the print image of the next page, the drawing unit 32 acquires the image data of the IR toner image from the page storing unit 34. The drawing unit 32 then superimposes the IR toner image data on the print image data generated earlier, thereby generating processed image data, and transmits the image data to the printer engine 35.

In the second case, when the print data concerns a page to be printed with the IR toner, the drawing unit 32 superimposes the attached IR toner image data at the position designated by the print position information in the print image data, thereby generating processed image data, and transmits the processed image data to the printer engine 35.

In the first case, the page storing unit 34 receives the image data of the IR toner image from the drawing unit 32, temporarily stores the image data, and returns the image data to the drawing unit 32. The printer engine 35 receives image data for each page and forms an image on the sheet according to the image data.

Processing or Operation of Printer Driver

Figure 12:
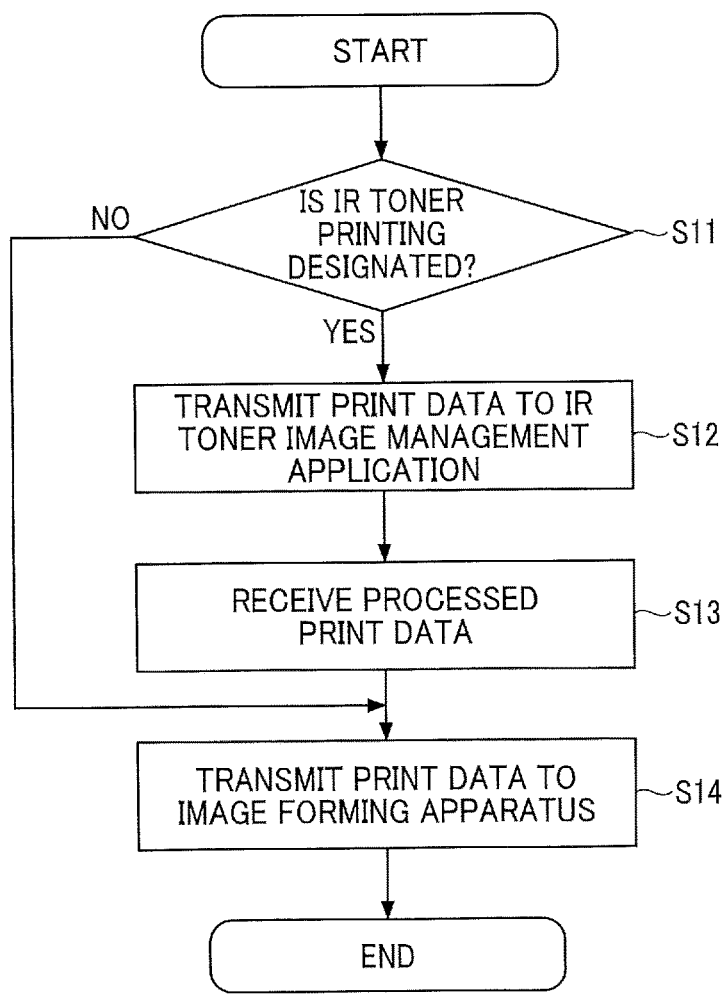
FIG. 12 is a flowchart illustrating an example of operation (or processing) performed by a printer driver of the information processing apparatus illustrated in FIG. 8.

FIG. 12 is a flowchart illustrating an example of operation (or processing) of the printer driver 11 of the information processing apparatus 10. The printer driver 11 starts the processing illustrated in FIG. 12 in response to reception of print data from a general-purpose application.

Figure 13:
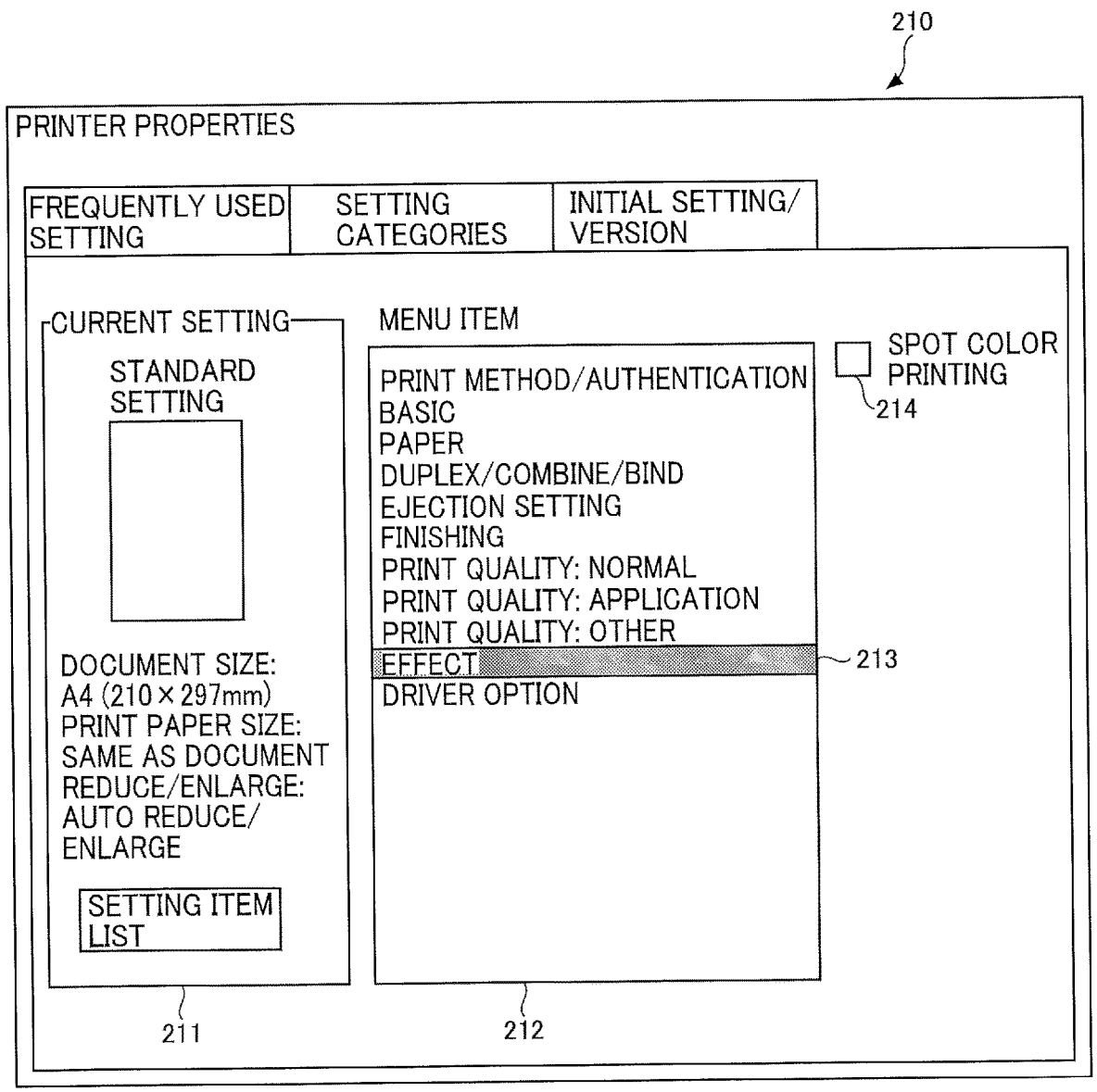
FIG. 13 illustrates an example of a print setting screen.

The user inputs the setting for IR toner printing on the print setting screen (see FIG. 13). Since the setting storing unit 23 stores the IR toner printing setting, the application invoking unit 24 refers to the setting storing unit 23 and determines whether or not the IR toner printing is designated (S11). In response to a determination of No in S11, the printer driver 11 proceeds to S14. That is, in the same manner as printing using ordinary toner, the printer driver 11 converts the print image into print data and transmits the print data as is to the image forming apparatus 30.

In response to a determination of Yes in step S11, the application invoking unit 24 transmits the print data of the print image to the IR toner image management application 12 (S12).

The application invoking unit 24 receives processed print data from the IR toner image management application 12 (S13). The processed image data is either print data in which the IR toner image is inserted before the print image (first case), or print data in which the IR toner image and print position information are added for each page (second case).

The communication unit 25 transmits the print data of the print image and the IR toner image to the image forming apparatus 30 in page order (S14).

Example of Print Setting Screen

FIG. 13 illustrates an example of a print setting screen 210. The print setting screen 210 includes a current setting field 211, a menu field 212, and a spot color print setting check box 214. The current print settings and a preview are displayed in the current setting field 211. In the menu field 212, print setting items are displayed so as to be selectable. A menus 213 concerns a spot color printing effect. In response to pressing by the user of the menus 213 (spot color printing effect), the spot color print setting check box 214 is displayed. A user who wants to perform printing with the IR toner checks the spot color print setting check box 214. The operation receiving unit 22 of the printer driver 11 can receive the designation by the user as to whether or not to perform printing with the IR toner.

Descriptions are given of user setting of the IR toner image management application 12 (IR image management table).

Figure 14:
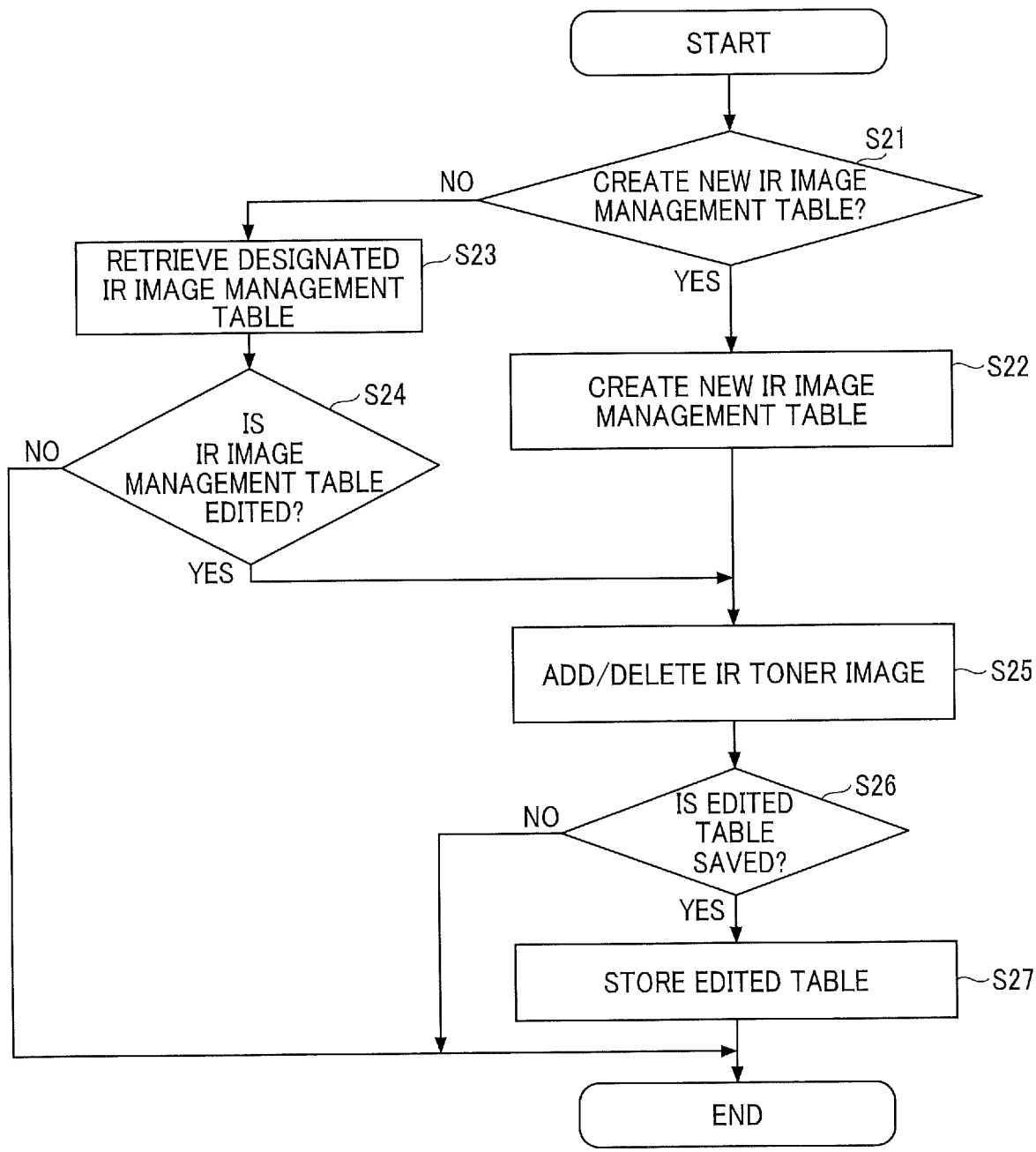
FIG. 14 is a flowchart illustrating an example of operation (or processing) of the IR toner image management application for accepting settings by a user for generating an IR image management table.

With reference to FIG. 14, a description is given of generation of the IR image management table, for which the user directly activates the IR toner image management application 12 on the information processing apparatus 10. FIG. 14 is a flowchart illustrating an example of operation (or processing) of the IR toner image management application 12 for accepting user settings for generating an IR image management table. The user can directly start the IR toner image management application 12 and control the IR toner image.

The operation receiving unit 27 of the IR toner image management application 12 determines whether or not the user operation is for creating a new IR image management table (S21). Creating an IR image management table means registering an IR toner image.

In response to a determination of Yes in step S21, the image management unit 28 creates a new IR image management table (S22).

In response to a determination of No in step S21, the image management unit 28 transmits the list of existing IR image management tables to the UI display unit 26 according to the operation by the user. The UI display unit 26 displays the list of IR image management tables and retrieves an IR image management table designated by the user (S23). The operation receiving unit 27 determines whether or not the user has edited (changed) the IR image management table (S24). When the user does not change the IR image management table, the operation illustrated in FIG. 14 ends.

When the user creates or changes the IR image management table, the image management unit 28 adds or deletes the IR toner image or the memo (S25).

When the user saves the IR image management table to which the IR toner image is added or deleted (Yes in S26), the image management unit 28 stores the corresponding IR image management table (S27). When the user does not save the IR image management table No in S26), the operation illustrated in FIG. 14 ends.

In this way, the user can register the IR toner image in the IR toner image management application 12 in advance. Further, as described later with reference to FIG. 15, the user can also register the IR toner image in the IR toner image management application 12 at the time of printing.

Descriptions are given of operation (or processing) of the IR toner image management application 12 invoked by the printer driver 11 (the first case).

Figure 15:
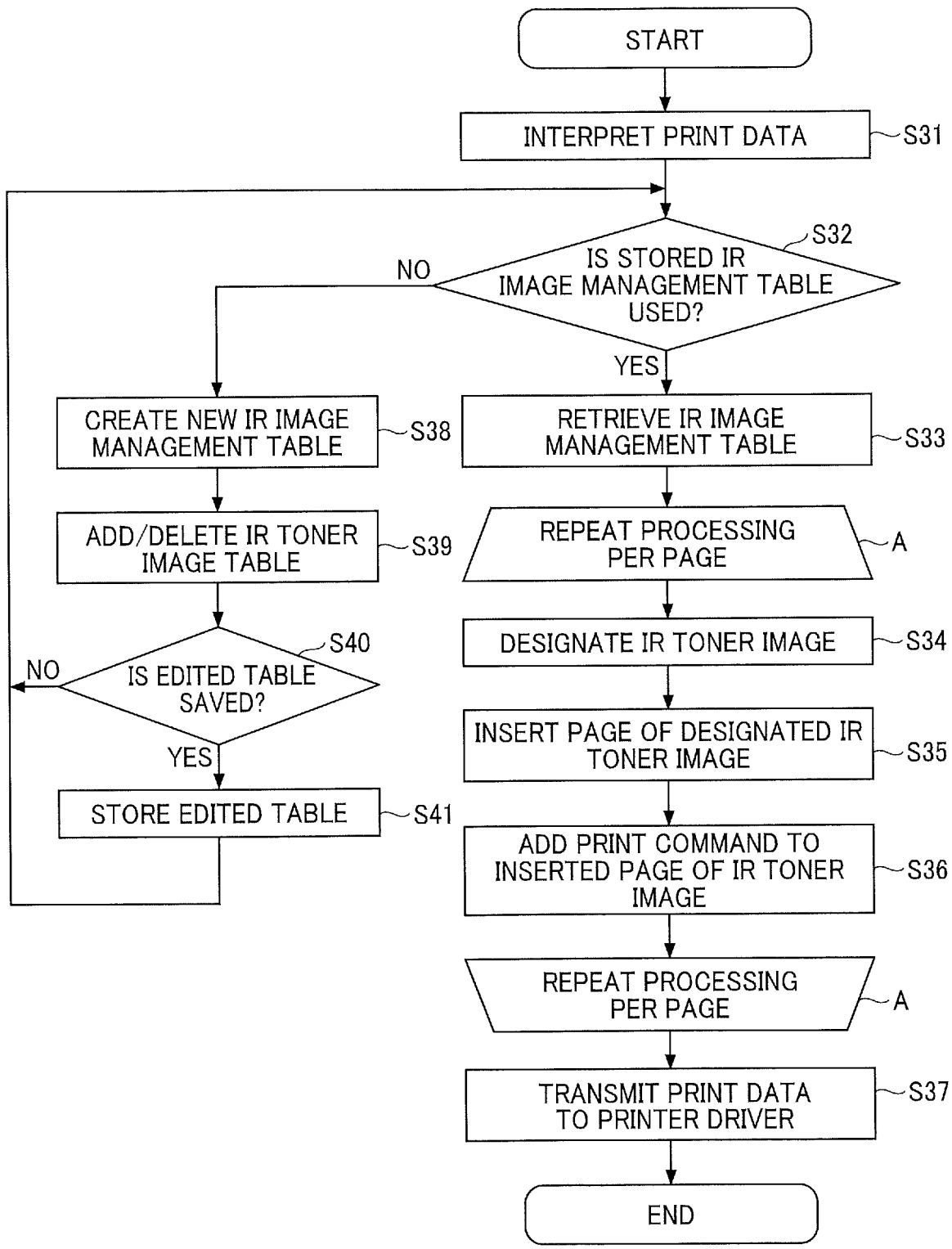
FIG. 15 is a flowchart illustrating an example of operation (or processing) of the IR toner image management application invoked by the printer driver (the first case)

FIG. 15 is a flowchart illustrating an example of the processing or operation of the IR toner image management application 12 invoked by the printer driver 11. Note that FIG. 15 illustrates the operations in the first case described above.

The IR toner image management application 12 receives the print data of the print image. The processing unit 29 receives the print data of the print image and interprets the page breaks and the number of pages (S31).

When the user uses the stored IR image management table (Yes in S32), the image management unit 28 retrieves the list of the IR image management tables according to the operation by the user (S33).

As described below, the processing unit 29 repeats the processes for each page of the print image (loop A).

The operation receiving unit 27 receives designation of an IR toner image to be overprinted on the print image from the list of the IR image management tables (S34). The processing unit 29 inserts the page of the designated IR toner image before the print image (S35). Further, the processing unit 29 adds, to the inserted page, a print command instructing that pages is to be printed with the IR toner (S36).

The IR toner image management application 12 returns the processed print data to the printer driver 11 after the processing is completed (S37).

When the user does not use the stored IR image management table (No in S32), the image management unit 28 creates a new IR image management table (S38).

According to addition or deletion of the IR image management table performed by the user, the image management unit 28 adds or deletes the IR image management table (S39).

When the IR image management table added by the user is saved (Yes in S40), the image management unit 28 stores the corresponding IR image management table (S41).

In a case where the IR toner image does not change even when the print image changes, it is preferable that the IR toner image management application 12 has the association between the page number of the print image and the IR toner image. The IR toner image management application 12 can insert the IR toner image based on such association, thus dispensing the user from performing the operation illustrated in FIG. 15.

A description is given of operation (or processing) of the IR toner image management application 12 invoked by the printer driver 11 (the second case).

Figure 16:
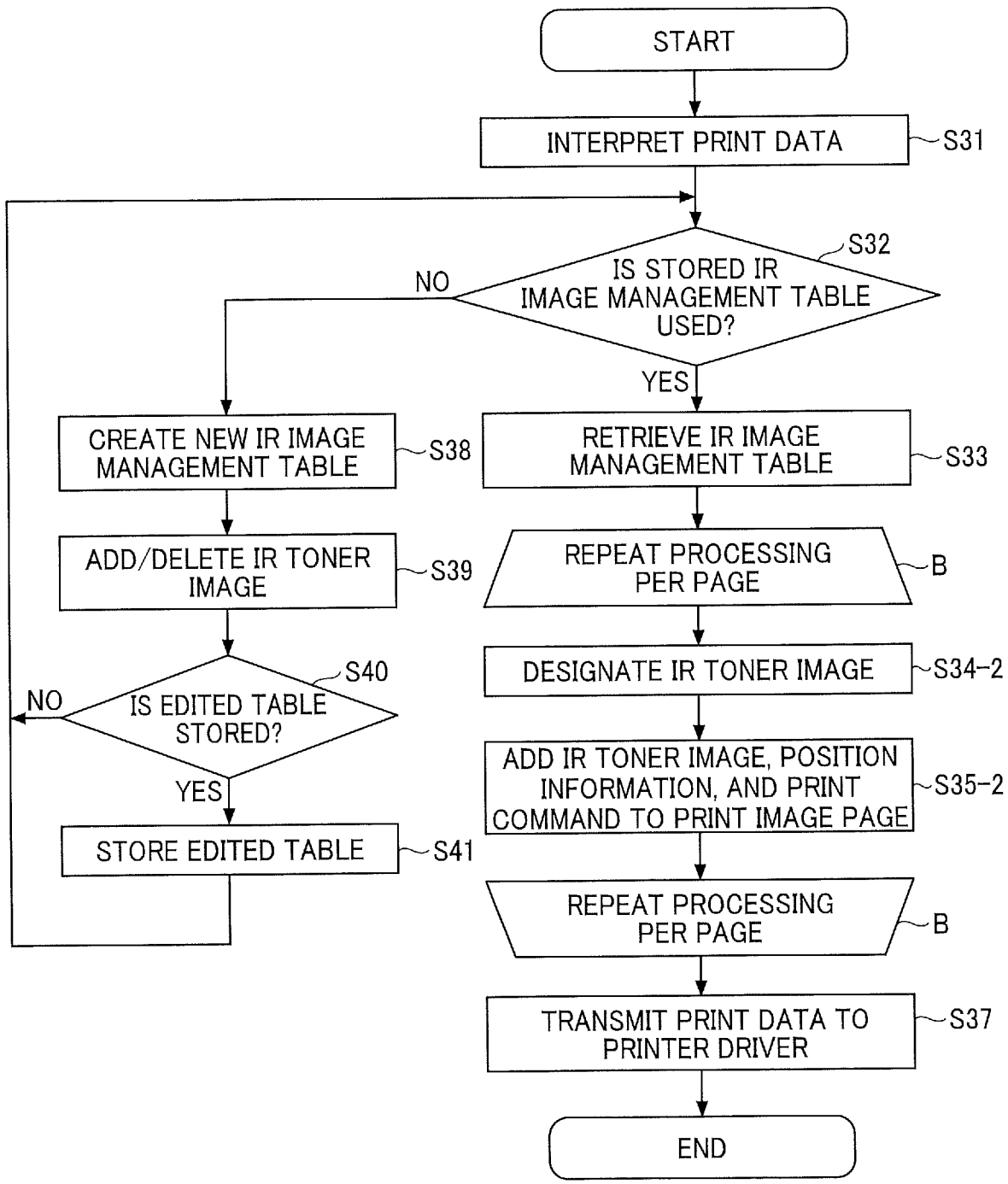
FIG. 16 is a flowchart illustrating an example of operation (or processing) of the IR toner image management application invoked by the printer driver (the second case)

FIG. 16 is a flowchart illustrating an example of the operation (or processing) of the IR toner image management application 12 invoked by the printer driver 11. Note that FIG. 16 describes the second case described above. In the following description on FIG. 16, the differences from FIG. 15 are described. In FIG. 16, the processing of loop B is different from that of loop A in FIG. 15.

The operation receiving unit 27 receives the designation of the IR toner image and the print position for each page (S34-2). The processing unit 29 adds, to the page of the print image, the designated IR toner image, the print position information of the IR toner image, and the print command instructing printing with the IR toner (S35-2).

Operation or Processes Performed by Image Forming Apparatus

First Case

Figure 17:
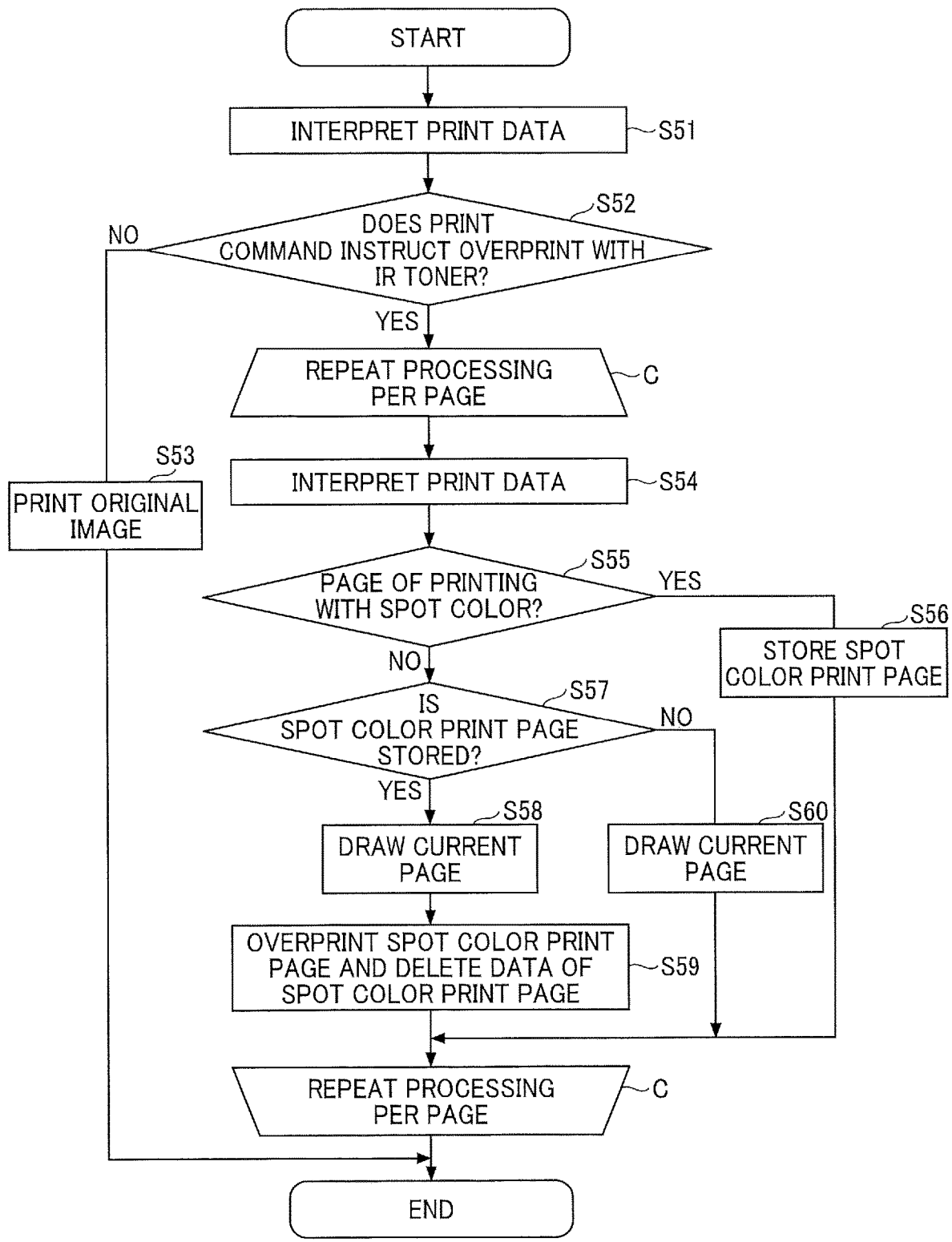
FIG. 17 is a flowchart illustrating an example of printing operation (or processing) performed by the image forming apparatus in the first case.

A description is given below of a procedure performed by the image forming apparatus 30 for IR toner printing, with reference to FIG. 17. FIG. 17 is a flowchart illustrating an example of printing operation (or processing) performed by the image forming apparatus 30 in the first case. The processes in FIG. 17 start in response to reception of print data by the communication unit 31 of the image forming apparatus 30.

First, the drawing unit 32 interprets, with the command interpretation unit 33, the print command of the print data, page by page, to the last page (S51).

The drawing unit 32 determines whether or not the print data includes, at least, one page including the printing command instructing printing (overprinting) with the IR toner (S52).

When none of the pages includes the print command instructing printing with the IR toner (No in S52), the drawing unit 32 generates image data (bitmap data) of the original print image, sends the image data to the printer engine 35, and prints the print image (S53).

When a print command instructing printing with the IR toner is included in even one page (Yes in S52), loop C is executed for each page.

The command interpretation unit 33 interprets the print command of the current page (S54). The command interpretation unit 33 determines whether or not the print command of the current page includes the print command instructing printing with the IR toner as the spot color toner (S55).

In response to a determination of Yes in step S55, the drawing unit 32 stores the current page in the page storing unit 34 (S56). That is, the page of the IR toner image (spot color print page) is stored.

Then, in loop C, the process returns to step S54, and the next page as a print image is processed. Assume that this page does not include a print command instructing printing with the IR toner. Then, the determination in step S55 is No, and the drawing unit 32 determines whether or not the image data of the page to be printed with IR toner is stored in the page storing unit 34 (S57).

When the determination in step S57 is Yes, the IR toner image is superimposed (to be overprinted) on the current page. Therefore, first, the drawing unit 32 generates image data of the current page as a print image (S58). Then, the drawing unit 32 acquires the image data of the page (the IR toner image) to be printed with the IR toner stored in the page storing unit 34, superimposes the IR toner image on the image data of the current page, and draws the resultant image with the printer engine 35 (S59). At that time, the image data to be printed with the IR toner stored in the page storing unit 34 is deleted.

When the determination in step S57 is No, the current page is printed as is, so the drawing unit 32 draws the image data of the current page with the printer driver 11 (S60).

When the processing of loop C is completed to the last page, the processing of FIG. 17 ends.

Second Case

Figure 18:
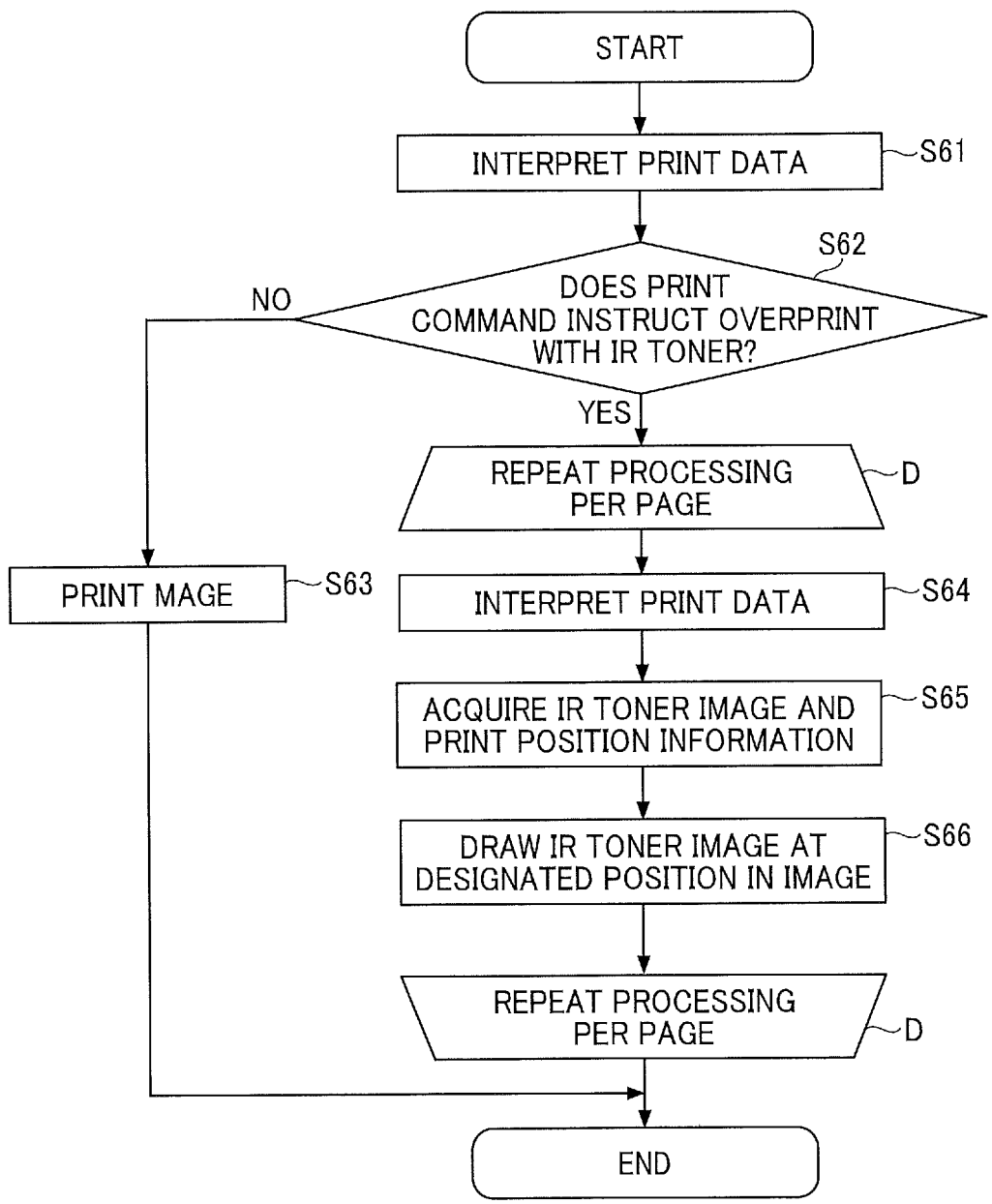
FIG. 18 is a flowchart illustrating an example of printing operation (or processing) performed by the image forming apparatus in the second case.

Next, a description is given of a procedure performed by the image forming apparatus 30 for IR toner printing, with reference to FIG. 18. FIG. 18 is a flowchart illustrating an example of printing operation (or processing) performed by the image forming apparatus 30 in the second case. The processes of FIG. 18 start in response to reception of print data by the communication unit 31 of the image forming apparatus 30.

First, the drawing unit 32 interprets, with the command interpretation unit 33, the print command of the print data, page by page, to the last page (S61).

The drawing unit 32 determines whether or not the print data includes, at least, one page including the printing command instructing printing (overprinting) with the IR toner (S62).

When none of the pages includes the print command instructing printing with the IR toner (No in S62), the drawing unit 32 generates image data (bitmap data) of the original print image, sends the image data to the printer engine 35, and prints the print image (S63).

When a print command instructing printing with the IR toner is included in even one page (Yes in S62), loop D is executed for each page.

The command interpretation unit 33 interprets the print command of the current page (S64). The command interpretation unit 33 determines whether or not the print command of the current page includes the print command instructing printing with the IR toner as the spot color toner.

When the current page includes the print command instructing printing with the IR toner, the drawing unit 32 acquires the IR toner image and print position information thereof, which are added to that page (S65).

Next, the drawing unit 32 superimpose the IR toner image at a position designated by the print position information of the print image, generates the image data, and prints the image data with the printer engine 35 (S66).

When the processing of loop D is completed to the last page, the processing of FIG. 18 ends.

A supplementary description is given of IR toner printing by the image forming apparatus 30.

Figure 19:
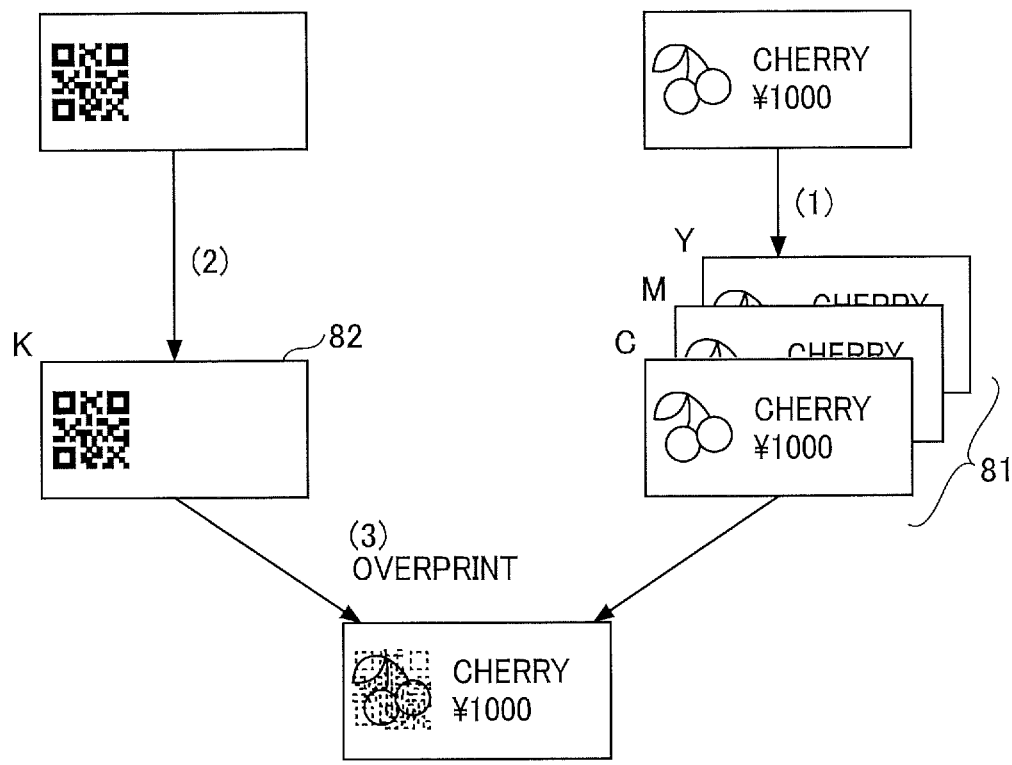
FIG. 19 is a diagram illustrating print processing using with the IR toner, performed by the image forming apparatus illustrated in FIG. 11.

FIG. 19 is a diagram illustrating processes of printing with the IR toner performed by the image forming apparatus 30. This image forming apparatus 30 in this embodiment is a general image forming apparatus without a capability of an IR toner (spot color) designation (can designate only cyan, magenta, yellow, and black). The image forming apparatus 30 according to the present embodiment is a color printer that performs printing with a combination of four colors of cyan, magenta, yellow, and black (C, M, Y, and K). The image forming apparatus 30 converts the RGB print data output by the printer driver 11 into cyan print data, magenta print data, and yellow print data, respectively. That is, the RGB print data is not converted to black print data. Black can be expressed by cyan, magenta, and yellow not all of cyan, magenta, yellow, and black. A general image forming apparatus also uses black to improve the color development property and reduce the amount of toner consumption. In the image forming apparatus 30 according to the present embodiment, the IR toner is assigned to black by utilizing the fact that black can be printed without black toner (IR toner is contained in the black toner cartridge instead).

(1) The image forming apparatus 30 generates a plain image 81 for each of cyan, magenta, and yellow based on the print image out of the print data transmitted from the information processing apparatus 10. In the plain image 81, the presence or absence of coloring is indicated by a bit, and the plain image 81 is image data in which each pixel is represented by 1 or 0.

(2) The image forming apparatus 30 converts the print data transmitted from the information processing apparatus 10 into a black plain image 82 based on the IR toner image. This is because black is assigned to the IR toner in the image forming apparatus 30, and the color may be converted into a vacant color (color is not assigned) in the image forming apparatus 30.

(3) The image forming apparatus 30 forms the cyan plain image 81 with cyan toner, the magenta plain image 81 with magenta toner, and the yellow plain image 81 with yellow toner. The mage forming apparatus 30 further forms the black plain image 82 with the IR toner Y in an overprinting manner. Thus, the image forming apparatus 30 can output a product in which the IR toner image is printed with the IR toner.

As described above, the printing system 100 according to the present embodiment can perform IR toner printing without an image forming apparatus capable of designating the IR toner, the application software capable of designating the IR toner, or both.

The overprint is described below.

In this embodiment, overprinting is designated at the time of printing. Overprinting is printing one color superimposed on another color.

Figure 20A:
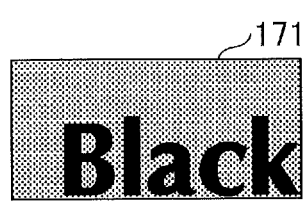
FIGS. 20A, 20B, and 20C illustrate an example of overprint.
Figure 20B:
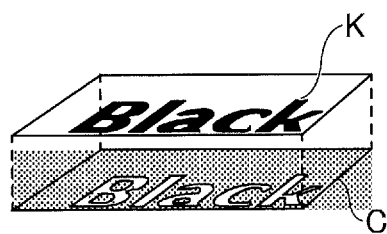
Figure 20C:
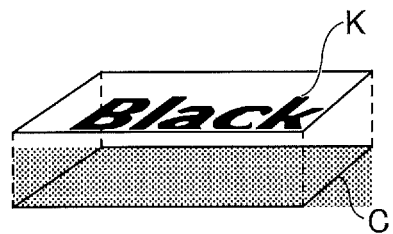

FIGS. 20A, 20B, and 20C illustrate an example of overprint. FIG. 20A illustrates an output 171 output by the image forming apparatus 30. The output 171 is printed in two colors, cyan for the background and black for a text (Black). Therefore, in the printing process, a cyan plain image 81 and a black plain image 82 are generated. When overprint is not designated, as illustrated in FIG. 20B, the image forming apparatus 30 masks the black portion (in the outlined manner) to generate a cyan plain image 81. When the overprint is designated, as illustrated in FIG. 20C, the image forming apparatus 30 generates a cyan plain image 81 without masking the black portion (without outlining).

When the overprint is not designated, the gap between the lower color (cyan in FIGS. 20A to 20C) and the upper color (black in FIGS. 20A to 20C) may be noticeable. When the overprint is designated, the two colors may be undesirably mixed, and the color displayed by the application software may not be reproduced in the output 171. The spot color in this embodiment is transparent. Even though the presence or absence of overprint is set according to the document, the lower color (photograph, etc.) is outlined when overprint is not designated. On the other hand, since the spot color is transparent, the color is unlikely to change due to designation of overprint. Therefore, in the present embodiment, with the overprint designation, the black plain image 82 assigned with the spot color is printed. Cyan, magenta, and yellow can be without the designation of overprint.

As described above, the printing system 100 according to the present embodiment can perform printing using the IR toner with an application that handles general RGB image data. Further, users can use the entire page to design a print image.

The above-described embodiment is illustrative and does not limit the present disclosure. Thus, numerous additional modifications and variations are possible in light of the above teachings within the scope of the present disclosure. Any one of the above-described operations may be performed in various other ways, for example, in an order different from the one described above.

For example, in the present embodiment, a toner transparent to visible light is used, but alternatively, colors, such as gold, silver, and white, other than cyan, magenta, yellow, and black may be used.

Further, the present embodiment mainly concerns electrophotographic printing, but aspects of the present disclosure are suitably applicable to an inkjet printer that discharges liquid droplets.

FIGS. 8 and 11 illustrate the examples the configurations in which processing units are divided according to main functions in order to facilitate understanding of processing performed by the information processing apparatus 10 and the image forming apparatus 30. The present disclosure is not limited by the manner of division of processing units or the name of the processing unit. The processing performed by the information processing apparatus 10 and the image forming apparatus 30 may be divided into a greater number of units depending on the processing details. In addition, such division can be such that a single processing unit includes a plurality of processes.

Further, each of the functions of the described embodiments may be implemented by one or more processing circuits or circuitry. Here, the "processing circuit or circuitry" in the present specification includes a programmed processor to execute each function by software, such as a processor implemented by an electronic circuit, and devices, such as an application specific integrated circuit (ASIC), a digital signal processors (DSP), a field programmable gate array (FPGA), and conventional circuit modules arranged to perform the recited functions.

Any one of the above-described operations may be performed in various other ways, for example, in an order different from the one described above.

The invention claimed is:
1. A printing system comprising:
an information processing apparatus; and
an image forming apparatus,
the information processing apparatus including first circuitry configured to:
receive designation of superimposing an image of a particular color on a print target image;
associate the image of the particular color with the print target image in response to a reception of the designation of superimposing; and
transmit print data including the print target image and the image of the particular color to the image forming apparatus, the image forming apparatus including:
second circuitry configured to receive the print data and interpret the print data; and a printer engine configured to superimpose the image of the particular color on the print target image in printing, according to interpretation of the print data, wherein the first circuitry is configured to:
insert a page of the image of the particular color before a page of the print target image based on the designation of superimposing;
add, to the page of the image of the particular color, a command instructing printing in the particular color; and
transmit, to the image forming apparatus, the print data including the print target image, the page of the image of the particular color inserted before the page of the print target image, and the command instructing printing in the particular color.

2. The printing system according to claim 1,
wherein the first circuitry executes a printer driver to receive the designation of superimposing and executes an application to associate the image of the particular color with the print target image in response to the reception of the designation of superimposing, and
wherein the first circuitry executing the printer driver invokes the application in response to the reception of the designation of superimposing.

3. The printing system according to claim 2,
wherein the first circuitry executing the application stores information on one or more images of the particular color, and
wherein, when invoking the application from the printer driver, the first circuitry displays, on a display, a list of the one or more images of the particular color stored in advance and receives selection of the image of the particular color to be superimposed on the print target image.

4. The printing system according to claim 3,
wherein the first circuitry is configured to:
receive an addition of an image of the particular color to be superimposed on the print target image, and
store, in a storage area, the added image of the particular color.

5. The printing system according to claim 3,
wherein the first circuitry is configured to receive the selection of the image of the particular color to be superimposed on the print target image in printing, for each page of the print target image.

6. The printing system according to claim 1,
wherein the second circuitry of the image forming apparatus is configured to:
determine, for each page, whether the image on the page is the image of the particular color based on the command;
based on a determination that the image on the page is the image of the particular color, store, in a storage area, the image of the particular color; and
superimpose, on the print target image, the image of the particular color retrieved from the storage area.

7. A printing system comprising:
an information processing apparatus; and
an image forming apparatus,
the information processing apparatus including first circuitry configured to:
receive designation of superimposing an image of a particular color on a print target image;
associate the image of the particular color with the print target image in response to a reception of the designation of superimposing; and
transmit print data including the print target image and the image of the particular color to the image forming apparatus,
the image forming apparatus including:
second circuitry configured to receive the print data and interpret the print data; and
a printer engine configured to superimpose the image of the particular color on the print target image in printing, according to interpretation of the print data,
wherein the first circuitry is configured to:
add, to the print target image, the image of the particular color, position information of the image of the particular color, and a command instructing printing in the particular color based on the designation of superimposing; and
transmit, to the image forming apparatus, the print data including the print target image, the image of the particular color added to the print target image, the position information of the image of the particular color, and the command instructing printing in the particular color, and
wherein the second circuitry of the image forming apparatus is configured to:
determine, for each page, whether the page includes the image of the particular color based on the command; and
based on a determination that the page includes the image of the particular color, superimpose the image of the particular color added to the print target image at a position specified by the position information in the print target image.

8. An information processing apparatus comprising circuitry configured to:
receive designation of superimposing an image of a particular color on a print target image;
associate the image of the particular color with the print target image in response to a reception of the designation of superimposing; and
transmit print data including the print target image and the image of the particular color to an image forming apparatus,
wherein the circuitry is configured to:
insert a page of the image of the particular color before a page of the print target image based on the designation of superimposing;
add, to the page of the image of the particular color, a command instructing printing in the particular color; and
transmit, to the image forming apparatus, the print data including the print target image, the page of the image of the particular color inserted before the page of the print target image, and the command instructing printing in the particular color.

9. A non-transitory recording medium storing a plurality of program codes which, when executed by one or more processors, causes the processors to perform a method for processing information, the method comprising:
receiving designation of superimposing an image of a particular color on a print target image;
associating the image of the particular color with the print target image in response to a reception of the designation of superimposing; and
transmitting print data including the print target image and the image of the particular color to an image forming apparatus,
wherein the method further comprising:

inserting a page of the image of the particular color before a page of the print target image based on the designation of superimposing;

adding, to the page of the image of the particular color, a command instructing printing in the particular color; and transmitting, to the image forming apparatus, the print data including the print target image, the page of the image of the particular color inserted before the page of the print target image, and the command instructing printing in the particular color.

\* \* \* \* \*